US011778223B2

(12) United States Patent
Liu et al.

(10) Patent No.: US 11,778,223 B2
(45) Date of Patent: Oct. 3, 2023

(54) METHOD, DEVICE, AND MEDIUM FOR GENERATING SUPER-RESOLUTION VIDEO

(71) Applicants: Wentao Liu, Markham (CA); Yuanhao Yu, Markham (CA); Yang Wang, Markham (CA); Juwei Lu, Markham (CA); Xiaolin Wu, Markham (CA); Jin Tang, Markham (CA)

(72) Inventors: Wentao Liu, Markham (CA); Yuanhao Yu, Markham (CA); Yang Wang, Markham (CA); Juwei Lu, Markham (CA); Xiaolin Wu, Markham (CA); Jin Tang, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/406,845

(22) Filed: Aug. 19, 2021

(65) Prior Publication Data

US 2023/0057261 A1      Feb. 23, 2023

(51) Int. Cl.
| *H04N 19/59* | (2014.01) |
| *H04N 19/51* | (2014.01) |
| *H04N 19/184* | (2014.01) |
| *H04N 19/136* | (2014.01) |

(52) U.S. Cl.
CPC ........... *H04N 19/51* (2014.11); *H04N 19/136* (2014.11); *H04N 19/184* (2014.11)

(58) Field of Classification Search
None
See application file for complete search history.

(56) References Cited

U.S. PATENT DOCUMENTS

2022/0180477 A1*   6/2022   Lu .................. H04N 19/139

FOREIGN PATENT DOCUMENTS

| CN | 103400394 A | 11/2013 |
| CN | 110062232 A | 7/2019 |
| CN | 112019861 A | 12/2020 |
| CN | 112449140 A | 3/2021 |
| JP | 2013229768 A | 11/2013 |
| WO | 2015101627 A1 | 7/2015 |

OTHER PUBLICATIONS

Caballero, et al., "Real-Time Video Super-Resolution with Spatio-Temporal Networks and Motion Compensation", pp. 4778-4787.
(Continued)

*Primary Examiner* — Christopher G Findley

(57) ABSTRACT

A method, device and computer-readable medium for generating a super-resolution version of a compressed video stream. By leveraging the motion information and residual information in compressed video streams, described examples are able to skip the time-consuming motion-estimation step for most frames and make the most use of the SR results of key frames. A key frame SR module generates SR versions of I-frames and other key frames of a compressed video stream using techniques similar to existing multi-frame approaches to VSR. A non-key frame SR module generates SR version of the non-key inter frames between these key frames by making use of motion information and residual information used to encode the inter frames in the compressed video stream.

16 Claims, 16 Drawing Sheets

(56) References Cited

OTHER PUBLICATIONS

Chen, et al., "When Bitstream Prior Meets Deep Prior: Compressed Video Super-resolution with Learning from Decoding", Oct. 12-16, 202, pp. 1000-1008.
Jo, et al., "Deep Video Super-Resolution Network Using Dynamic Upsampling Filters Without Explicit Motion Compensation", pp. 3224-3232.
Liu, et al., "Video Super Resolution Based on Deep Learning: A Comprehensive Survey", Dec. 20, 2020, pp. 1-30.
Sun, et al., "PWC-Net: CNNs for Optical Flow Using Pyramid, Warping, and Cost Volume", pp. 8934-8943.
Van Ouwerkerk, "Image super-resolution survey", Feb. 21, 2006.
Wang, et al., "EDVR: Video Restoration with Enhanced Deformable Convolutional Networks".
Wang et al., "Deep Video Super-Resolution Using HR Optical Flow Estimation", pp. 4323-4336.
Wang, et al., "Deep Learning for Image Super-resolution: A Survey", pp. 1-22.
Xue, et al., "Video Enhancement with Task-Oriented Flow", Feb. 12, 2019, pp. 1106-1125.
Zhang, et al., "Residual Dense Network for Image Super-Resolution", pp. 2472-2481.

\* cited by examiner

METHOD, DEVICE, AND MEDIUM FOR GENERATING SUPER-RESOLUTION VIDEO

RELATED APPLICATION DATA

This is the first patent application related to this matter.

TECHNICAL FIELD

The present disclosure relates to video enhancement, and in particular, to a method, device, and computer-readable medium for generating a super-resolution version of a compressed video stream.

BACKGROUND

Video super-resolution (VSR) is a technique that reconstructs a super-resolution (SR) video with reasonable details from a lower-resolution (LR) counterpart. In the context of this application, "super-resolution" may refer to any target image resolution greater than 1080p, such as 4K, and "lower-resolution" refers, in context, to any image resolution lower than the target image resolution. VSR techniques have a wide range of potential applications, from consumer video streaming services to the professional film industry.

Early VSR approaches generated SR video by up-sampling each LR video frame independently. These early VSR approaches can be reduced to a sequence of single-image super-resolution (SISR) tasks. Conventional SISR approaches treat the generation of SR images as an interpolation problem, and typically solve the problem using base functions such as bicubic or Lanczos kernels, as described by J. D. Van Ouwerkerk. "Image super-resolution survey." Image and vision Computing 24, no. 10 (2006): 1039-1052. Such early VSR approaches are typically simple, fast, and easy to implement, but are also notoriously known for the blurry look of their output, the introduction of staircase-like artifacts, and the loss of high-frequency (HF) details.

In order to overcome these shortcomings, some later SISR approaches use fully data-driven approaches to train convolutional neural networks (CNNs) to learn a non-linear mapping function from LR images to HR images, as described by Z. Wang, J. Chen, and S. CH Hoi. "Deep learning for image super-resolution: A survey." IEEE transactions on pattern analysis and machine intelligence (2020). Such later SISR approaches can be generally summarized as a feature extraction module followed by an SR image reconstruction module; each individual video frame is processed by the feature extraction module, the output of which is processed by the SR image reconstruction module to generate the HR version of the video frame. These later SISR approaches are sometimes able to recover sharper edges and richer details relative to the earlier kernel-based SISR approaches, but suffer from unnatural artifacts due to the highly ill-posed nature of the SISR problem.

More recently, multi-frame algorithms have been used to generate VSR. In order to generate a SR frame at time t, a multi-frame algorithm is used to process not only the corresponding LR frame at time t of a LR video, but also its LR neighbors at times t−1 and t+1. By fusing information from multiple frames of the LR video, the multi-frame approach may yield better SR results than single-frame SISR approaches, as described by H. Liu, Z. Ruan, P. Zhao, F. Shang, L. Yang, and Y. Liu. "Video super resolution based on deep learning: A comprehensive survey." arXiv preprint arXiv:2007.12928 (2020).

On the other hand, the data processing pipeline of a multi-frame approach may be much more complex than that of a single-frame SISR approach. In general, a multi-frame model first extracts relevant feature maps from the target LR frame (time=t) and neighboring LR frames (time=t−1 and time=t+1) independently. Then the relative motion between each neighboring LR frames and target LR frame is estimated and used for aligning the feature maps from the neighboring frame to the target. Finally, the aligned features are fused and then used by an SR image reconstruction process to predict a SR version of the target LR frame. Previous research has shown that the motion estimation process is critical to the performance of multi-frame VSR approaches, as described by J. Caballero, L. Christian, A. Aitken, A. Acosta, J. Totz, Z. Wang, and W. Shi. "Real-time video super-resolution with spatio-temporal networks and motion compensation." In Proceedings of the IEEE Conference on Computer Vision and Pattern Recognition, pp. 4778-4787. 2017; Y. Jo, S. W. Oh, J. Kang, and S. J. Kim. "Deep video super-resolution network using dynamic upsampling filters without explicit motion compensation." In Proceedings of the IEEE conference on computer vision and pattern recognition, pp. 3224-3232. 2018; L. Wang, Y. Guo, L. Liu, Z. Lin, X. Deng, and W. An. "Deep video super-resolution using HR optical flow estimation." IEEE Transactions on Image Processing 29 (2020): 4323-4336; X. Wang, K. CK Chan, K. Yu, C. Dong, and C. C. Loy. "Edvr: Video restoration with enhanced deformable convolutional networks." In Proceedings of the IEEE/CVF Conference on Computer Vision and Pattern Recognition Workshops, pp. 0-0. 2019; and T. Xue, B. Chen, J. Wu, D. Wei, and W. T. Freeman. "Video enhancement with task-oriented flow." International Journal of Computer Vision 127, no. 8 (2019): 1106-1125. However, the motion estimation process also adds to the average processing time, because estimating motion from image pairs is a computationally intensive task, particularly on devices with limited computational resources, such as mobile devices, as described by D. Sun, X. Yang, M.-Y. Liu, and J. Kautz. "Pwc-net: Cnns for optical flow using pyramid, warping, and cost volume." In Proceedings of the IEEE conference on computer vision and pattern recognition, pp. 8934-8943. 2018. This computational intensity makes existing multi-frame VSR approaches difficult to deploy in many time-critical scenarios, such as generation of SR video in real time based on a compressed LR video stream received at a mobile device.

In summary, single-frame SISR approaches to VSR are relatively fast, but can only get SR results of inferior quality. Multi-frame VSR approaches may achieve higher-quality results, but suffer from excessive computational complexity, restricting their feasibility in various real-world applications.

In view of the foregoing, improvements to VSR techniques are desirable, and there is a need for a method for generating a super-resolution version of a compressed video stream that overcomes one or more of the limitations of existing approaches identified above.

SUMMARY

The present disclosure provides a method, device and computer-readable medium for generating a super-resolution version of a compressed video stream. Videos are normally stored and transmitted in the format of encoded bitstreams, which contain rich and free motion information, such as motion vectors (MVs) and residual maps. By leveraging the motion information and residual information in compressed video streams, embodiments described herein are able to skip the time-consuming motion-estimation step for most frames and make the most use of the SR results of key frames. Some embodiments may use a key frame SR module to generate SR versions of intra-coded frames (I-frames) and other key frames of a group of pictures (GOP) of a compressed video stream using techniques similar to existing multi-frame approaches to VSR. However, SR version of the inter frames between these key frames may be generated by making use of motion information and residual information used to encode the inter frames in the compressed video stream. Some embodiments described herein may therefore exhibit one or more advantages over existing SISR and/or multi-frame approaches to VSR, including lower computational intensity (thereby potentially broadening the range of real-world applications for VSR) and/or higher-quality SR images in the VSR output.

Embodiments described herein leverage the data available in compressed video streams, using a novel framework that may accelerate existing VSR approaches by several times while still preserving high output quality. These embodiments may enable deployment of advanced, high-quality VSR techniques in mobile devices or other platforms with limited computing resources. The framework described herein has some similarities to the approach proposed in P. Chen, W. Yang, L. Sun, and S. Wang. "When Bitstream Prior Meets Deep Prior: Compressed Video Super-resolution with Learning from Decoding." In Proceedings of the 28th ACM International Conference on Multimedia, pp. 1000-1008. 2020. ("Chen"). However, the embodiments described herein significantly differ from the approach described in Chen in that the present disclosure provides a general framework to accelerate any existing VSR method, including the approach described in Chen, whereas Chen proposes a new VSR algorithm which still cannot run in real time on computationally constrained platforms.

As used herein, the term "frame" refers to a video frame, i.e. a two-dimensional image included as one of a temporal sequence of images of a video.

As used herein, "frame encoding" refers to data that may be used by a decoder to decode, generate, or reconstruct a frame. A "video stream" or "compressed video stream" refers to data which includes multiple frame encodings, typically representative of a temporal sequence of frames.

In some aspects, the present disclosure describes a method for generating a super-resolution version of a compressed video stream. The method comprises a number of steps. At least a portion of the compressed video stream is obtained, comprising a plurality of frame encodings representative of a temporal sequence of frames. The plurality of frame encodings comprise an intra-coded frame (I-frame) encoding representative of an I-frame, and a first inter frame encoding representative of a first inter frame subsequent to the I-frame in the temporal sequence. The first inter frame encoding comprises motion information of the first inter frame relative to the I-frame, and residual information of the first inter frame relative to the I-frame. The I-frame encoding is decoded to generate the I-frame. The first inter frame encoding is decoded to generate the first inter frame, the motion information of the first inter frame, and the residual information of the first inter frame. The I-frame is processed to generate a super-resolution version of the I-frame. A super-resolution version of the first inter frame is generated by processing the first inter frame, the motion information of the first inter frame, the residual information of the first inter frame, the I-frame, and the super-resolution version of the I-frame.

By using existing motion information and residual information of the inter frames of a compressed video stream to generate super-resolution versions of inter frames, examples described herein may exhibit one or more advantages over existing SISR and/or multi-frame approaches to VSR, including lower computational intensity (thereby potentially broadening the range of real-world applications for VSR) and/or higher-quality SR images in the VSR output.

In some aspects, the present disclosure describes a device, comprising a processor, and a memory. The memory stores instructions which, when executed by the processor, cause the device to generate a super-resolution version of a compressed video stream. At least a portion of the compressed video stream is obtained, comprising a plurality of frame encodings representative of a temporal sequence of frames. The plurality of frame encodings comprise an intra-coded frame (I-frame) encoding representative of an I-frame, and a first inter frame encoding representative of a first inter frame subsequent to the I-frame in the temporal sequence. The first inter frame encoding comprises motion information of the first inter frame relative to the I-frame, and residual information of the first inter frame relative to the I-frame. The I-frame encoding is decoded to generate the I-frame. The first inter frame encoding is decoded to generate the first inter frame, the motion information of the first inter frame, and the residual information of the first inter frame. The I-frame is processed to generate a super-resolution version of the I-frame. A super-resolution version of the first inter frame is generated by processing the first inter frame, the motion information of the first inter frame, the residual information of the first inter frame, the I-frame, and the super-resolution version of the I-frame.

In some examples, the plurality of frame encodings further comprises a second inter frame encoding representative of a second inter frame subsequent to the first inter frame in the temporal sequence. The second inter frame encoding comprises motion information of the second inter frame relative to the first inter frame, and residual information of the second inter frame relative to the first inter frame. The method further comprises decoding the second inter frame encoding to generate the second inter frame, the motion information of the second inter frame, and the residual information of the second inter frame. The method further comprises generating a super-resolution version of the second inter frame by processing the second inter frame, the motion information of the second inter frame, the residual information of the second inter frame, the first inter frame, and the super-resolution version of the first inter frame.

In some examples, processing the I-frame to generate a super-resolution version of the I-frame comprises generating a super-resolution version of the I-frame by processing the I-frame, the first inter frame, and an additional frame decoded from the compressed video stream. The additional frame is prior to the temporal sequence of frames.

In some examples, the plurality of frame encodings further comprises a further inter frame encoding representative of a further inter frame subsequent to the second inter frame in the temporal sequence. The method further comprises decoding the further inter frame encoding to generate the further inter frame, identifying the further inter frame as a key frame, and generating a super-resolution version of the further inter frame. The super-resolution version of the further inter frame is generated by processing the further inter frame; at least one frame, prior to the further inter frame in the temporal sequence, decoded from the compressed video stream; and at least one frame, subsequent to the further inter frame in the temporal sequence, decoded from the compressed video stream.

In some examples, the super-resolution version of the first inter frame is generated by processing the I-frame, the first inter frame, the motion information of the first inter frame, and the residual information of the first inter frame to generate a refined motion map; and processing the refined motion map, the super-resolution version of the I-frame, and the residual information of the first inter frame to generate the super-resolution version of the first inter frame.

In some examples, the refined motion map is generated by warping the I-frame using the motion information of the first inter frame to generate a warped I-frame; concatenating the first inter frame, the motion information of the first inter frame, the residual information of the first inter frame, and the warped I-frame to generate a concatenated tensor; processing the concatenated tensor using a first convolution layer of a MV refining convolutional neural network (CNN); processing the output of the first convolution layer using a first residual dense block of the MV refining CNN; processing the output of the first residual dense block using one or more inter convolution layers and one or more inter residual dense blocks of the MV refining CNN to generate a MV refining CNN output tensor; reshaping the MV refining CNN output tensor using a pixel shuffling operation to generate a reshaped MV refining tensor; up-sampling the motion information of the first inter frame to generate up-sampled motion information; and processing the reshaped MV refining tensor and the up-sampled motion information to generate the refined motion map.

In some examples, processing the refined motion map, the super-resolution version of the I-frame, and the residual information of the first inter frame to generate the super-resolution version of the first inter frame comprises several steps. The refined motion map and the super-resolution version of the I-frame are processed to generate a warped high-frequency feature map. The first inter frame is processed to generate a feature map of the first inter frame. The feature map of the first inter frame, the warped high-frequency feature map, and the residual information of the first inter frame are processed to generate a fused feature map. The fused feature map and the first inter frame are processed to generate the super-resolution version of the first inter frame.

In some examples, the warped high-frequency feature map is generated by processing the super-resolution version of the I-frame using one or more convolution layers to generate a HF feature tensor, warping the HF feature tensor using the refined motion map to generate a warped HF feature tensor, and reshaping the warped HF feature tensor using a pixel unshuffling operation to generate the warped high-frequency feature map.

In some examples, processing the refined motion map, the super-resolution version of the I-frame, and the residual information of the first inter frame to generate the super-resolution version of the first inter frame comprises several steps. The super-resolution version of the I-frame is warped using the refined motion map to generate a warped super-resolution reference frame. The residual information of the first inter frame is up-sampled to generate up-sampled residual information. The warped super-resolution reference frame and the up-sampled residual information are processed to generate the super-resolution version of the first inter frame.

In some aspects, the present disclosure describes a non-transitory processor-readable medium having tangibly stored thereon instructions that, when executed by a processor of a device, cause the device to perform one or more of the methods described above.

In some aspects, the present disclosure describes a method for generating a super-resolution version of a first inter frame of a compressed video stream. The method comprises several steps. An intra-coded frame (I-frame), the first inter frame, motion information of the first inter frame, and residual information of the first inter frame decoded from at least a portion of the compressed video stream are obtained. A super-resolution version of the I-frame is obtained. The I-frame, the first inter frame, the motion information of the first inter frame, and the residual information of the first inter frame are processed to generate a refined motion map. The refined motion map, the super-resolution version of the I-frame, and the residual information of the first inter frame are processed to generate the super-resolution version of the first inter frame.

BRIEF DESCRIPTION OF THE DRAWINGS

Embodiments will now be described by way of examples with reference to the accompanying drawings, in which like reference numerals may be used to indicate similar features.

DESCRIPTION OF EXAMPLE EMBODIMENTS

Figure 1:
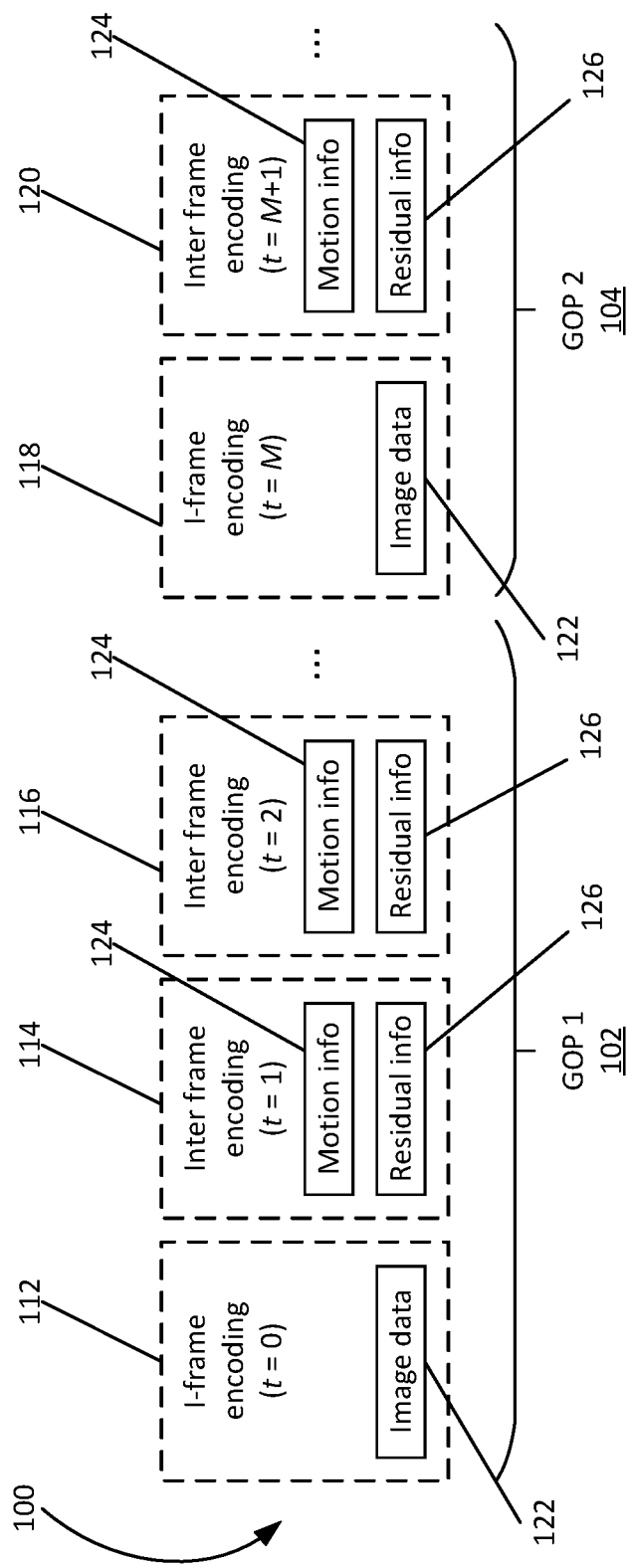
FIG. 1 is block diagram of the structure of an example compressed video stream 100, showing an example environment in which example embodiments may operate.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

Example embodiments of methods, devices and computer-readable media for generating super-resolution video will now be described. Some example embodiments use models trained using machine learning algorithms (also called "machine learning models"), such as trained neural networks, to perform all or part of the methods and operations described herein.

The existing approaches to VSR described above use either a single LR image, or a sequence of multiple consecutive LR images, as input. However, videos are often encoded into compressed formats, as known as compressed video streams or simply video streams, in order to save storage and bandwidth. A decoding process must be performed to generate the LR video encoded in the compressed video stream before the LR video images can be used as input to a VSR generation process. A device or process performing encoding and/or decoding of a compressed video stream may be referred to as a codec, meaning coder/decoder, or as an encoder (for encoding) or a decoder (for decoding).

Modern video codecs, such as various MPEG codecs including MPEG-1, MPEG-2, MPEG-4, and H.264/MPEG-4 AVC codecs, exploit the redundancy between adjacent frames of a video to achieve a high compression ratio, i.e. the ratio between the size of the uncompressed video prior to encoding and the compressed video stream after encoding. Let the current LR frame (at time=t) and the previous frame (at time=t−1) be denoted as $I_t \in \mathbb{R}^{H \times W \times 3}$ and $I_{t-1} \in \mathbb{R}^{H \times W \times 3}$, respectively. A video encoder essentially estimates a motion vector (MV) map $MV_t \in \mathbb{R}^{H \times W \times 2}$ and a residual map $R_t \in \mathbb{R}^{H \times W \times 3}$ so that the pixel value of $I_t$ at any position p can be recovered by $I_t(p)=I_{t-1}(p+MV_t(p))+R_t(p)$. As a result, the frame $I_t$ is replaced with $MV_t$ and $R_t$ in the encoded video stream, and for most videos, $MV_t$ and $R_t$ can be encoded with much fewer bits than the original pixel values because the physical world tends to evolve on a continuous basis and both large motions and sudden changes are relatively rare. When encoding a video, a video encoder typically splits the video into multiple groups-of-pictures (GOPs), each of which includes a temporal sequence of frames starting with an intra-coded frame (I-frame) followed by one or more inter frames (such as P-frames or B-frames). The initial I-frame of a GOP is encoded in the compressed video stream as an independent image: i.e., an I-frame encoding includes image data, without including a motion vector (MV) map or a residual map. The subsequent inter frames in a GOP are encoded in the compressed video stream as inter frame encodings including their respective motion information (e.g., a motion vector (MV) map) and residual information (e.g., a residual map), which are used to reconstruct the respective inter frame by transforming a prior frame in the temporal sequence (e.g., the initial I-frame of the GOP or a prior inter frame of the GOP). In practice, a GOP may include tens to hundreds of consecutive frames with only one I-frame, pushing the compression ratio to a very high level. In some examples, the number of frames included in a GOP is fixed; in other examples, different GOPs in a compressed video stream may include different numbers of frames. The number of frames included in a given GOP may be determined, in some examples, by characteristics of the video frames being encoded, e.g., a boundary between two consecutive frames corresponding to a cut from one shot to another may be used as the boundary between the end of one GOP and the beginning of another, based on the degree of visual discontinuity between the two frames. It will be appreciated that modern video encoding techniques may structure compressed video streams, GOPs, I-frame encodings, and inter frame encodings in various ways that are consistent with the embodiments described herein.

FIG. 1 shows the structure of an example compressed video stream 100. The compressed video stream 100 includes a plurality of frame encodings (shown as frame encodings 112, 114, 116, . . . 118, 120, . . . ) representative of a temporal sequence of frames, beginning with a first I-frame encoding 112 representative of a first I-frame at t=0, followed by an immediately subsequent first inter frame encoding 114 at t=1, followed by an immediately subsequent second inter frame encoding 116 at t=2, optionally followed by one or more additional inter frame encodings, followed by a second I-frame encoding 118 representative of a second I-frame at t=M, followed by an immediately subsequent further inter frame encoding 120 at t=M+1, optionally followed by one or more additional frame encodings. The plurality of frame encodings are segmented into one or more groups of pictures (GOPs), each of which may encompass a fixed or variable number of frame encodings, such as positive integer M number of frame encodings in GOP 1 102 shown in FIG. 1. The first GOP, GOP 1 102, includes the first I-frame encoding 112 and multiple subsequent inter frame encodings (including first inter frame encoding 114 and second inter frame encoding 116) representative of inter frames subsequent to the first I-frame in the temporal sequence, and a second GOP, GOP 2 104, includes the second I-frame encoding 118 and multiple subsequent inter frame encodings (including further inter frame encoding 120) representative of inter frames subsequent to the second I-frame in the temporal sequence. As described above, each I-frame encoding 112, 118 includes image data 122 representative of a LR frame, and each inter frame encoding 114, 116, 120 includes motion information 124 and residual information 126 of the respective inter frame relative to a prior frame in the temporal sequence, which are used to generate the corresponding LR frame in combination with one or more prior frames in the temporal sequence. In some examples, the motion information 124 of an inter frame encoding (such as 114, 116, or 120) includes a motion vector (MV) map of the corresponding frame relative to the prior frame in the temporal sequence, and the residual information 126 of the inter frame encoding includes a residual map of the corresponding frame relative to the prior frame in the temporal sequence. For example, the motion information 124 and residual information 126 of the first inter frame encoding 114 may include a motion vector (MV) map and a residual map used to define or generate the first inter frame relative to the first I-frame of the first I-frame encoding 112.

Thus, in decoding the compressed video stream 100, a decoder may first decode GOP 1 102. The decoder will decode the image data 122 of the first I-frame encoding 112 and use the resulting LR image as the video frame at t=0. The decoder will then decode or generate the first inter frame at t=1 by decoding the motion information 124 and residual information 126 from the first inter frame encoding 114, then applying video decompression techniques to reconstruct the LR frame at t=1 by transforming the LR image at t=0 using the motion information 124 and residual information 126. The second inter frame at t=2 is similarly decoded by transforming the reconstructed first inter frame at t=1 using the motion information 124 and residual information 126 decoded from the second inter frame encoding 116.

When a new GOP is encountered in the compressed video stream 100, such as GOP 2 104, the decoder begins the process again. The first frame encoding of the GOP is an I-frame encoding, such as second I-frame encoding 118 of GOP 2 104, and is decoded in the same manner as the first I-frame encoding 112, resulting in generation or decoding of a LR frame at t=M. Subsequent inter frames of the new GOP are decoded based on the LR frame generated The decoding process may be performed by a decoder before the entire compressed video stream 100 has been received. In some embodiments, the decoder may begin decoding frames from frame encodings of the compressed video stream 100 after obtaining only a portion of the compressed video stream 100, such as a single I-frame encoding, a single GOP, or any other portion of the compressed video stream 100 including at least one I-frame encoding (which must be obtained in order to establish a baseline LR frame from which subsequent inter frames are to be reconstructed).

Existing video codecs typically decode the frames of the compressed video stream 100 as described above, generating as output a temporal sequence of LR frames. The other information decoded from the compressed video stream 100, such as the motion information 124 and residual information 126 decoded from each inter frame encoding, is discarded once it has been used to decode or reconstruct the respective inter frame as a LR image. However, embodiments described herein may use a modified video decoder to retain this information and leverage this existing motion information 124 and residual information 126, in combination with the decoded or reconstructed LR frames, to assist with VSR generation, as described in greater detail below with references to FIGS. 3-11.

Example devices will now be described that perform the VSR operations and methods described herein.

Example Device

Figure 2:
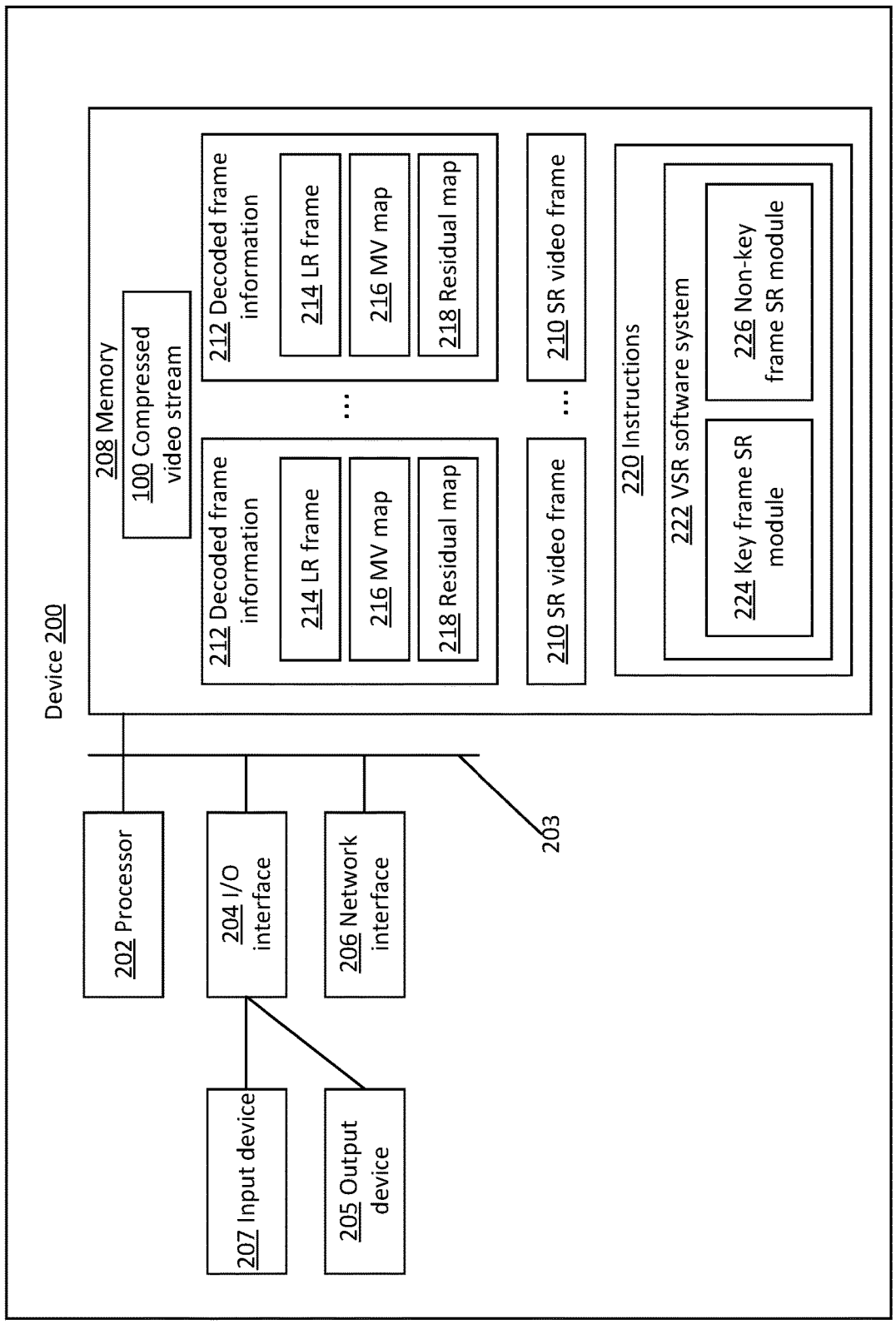
FIG. 2 is a block diagram of an example device for generating super resolution video according to example embodiments described herein.

FIG. 2 is a block diagram illustrating a simplified example of a device 200, such as a computer or a cloud computing platform, suitable for implementing examples described herein, and in particular for executing the method steps and operations described herein. Other examples suitable for implementing embodiments described in the present disclosure may be used, which may include components different from those discussed below. Although FIG. 2 shows a single instance of each component, there may be multiple instances of each component in the device 200.

The device 200 may include one or more processor devices, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof (the processor devices being referred to collectively as a processor 202). The device 200 may also include one or more optional input/output (I/O) interfaces (collectively referred to as I/O interface 204), which may enable interfacing with one or more input devices 207 (such as a keyboard, mouse, touchscreen, or camera) and/or output devices 205 (such as a display or speaker).

In the example shown, the input device(s) 207 and output device(s) 205 are shown as external to the device 200. However, it will be appreciated that some embodiments may combine one or more of the input devices 207 and/or output devices 205 into a single device.

The device 200 may include one or more network interfaces for wired or wireless communication with one or more devices or systems of a network, such as a network (collectively referred to as network interface 206). The network interface 206 may include wired links (e.g., Ethernet cable) and/or wireless links (e.g., one or more antennas) for intra-network and/or inter-network communications. In some embodiments, the device 200 may communicate with one or more of the input devices 207 and/or output devices 205 over a network using the network interface 206 instead of the I/O interface 204.

The device 200 may include one or more non-transitory memories (collectively referred to as memory 208), which may include a volatile or non-volatile memory (e.g., a flash memory, a random access memory (RAM), and/or a read-only memory (ROM)). The non-transitory memory 208 may store instructions 220 for execution by the processor 202, such as to carry out examples described in the present disclosure. The memory 208 may also include other processor-executable instructions 220, such as for implementing an operating system and other applications/functions. In some examples, the memory 208 may include instructions 220 for execution by the processor 302 to implement a VSR software system 222, including modules and submodules thereof, as described further below with reference to FIGS. 3-8B. The VSR software system 222 may be loaded into the memory 208 by executing the instructions 220 using the processor 202.

The memory 208 may also store data used and/or generated by the VSR software system 222. A compressed video stream 100, or a portion thereof, may be stored in the memory 208, for example after being received from an external source (e.g., via the network interface 206) and before and during processing by the VSR software system 222. Frame encodings of the compressed video stream 100 may be decoded by a decoder of the VSR software system 222 and the decoded frame information 212 of each frame encoding may be stored in the memory 208, including a decoded LR frame 214 (such as the image data 122 of an I-frame encoding or a reconstructed image for an inter frame encoding), a decoded MV map 216 (or other motion information) of an inter frame encoding, and/or a decoded residual map 218 (or other residual information) of an inter frame encoding. SR video frames 210 generated by the VSR software system 222 may also be stored in the memory 208, for example before being transmitted via the network interface 206 or presented to a user on a display device via the I/O interface 204.

In some examples, the device 200 may additionally or alternatively execute instructions from an external memory (e.g., an external drive in wired or wireless communication with the device 200) or may be provided executable instructions by a transitory or non-transitory computer-readable medium. Examples of non-transitory computer readable (i.e. processor readable) media include a RAM, a ROM, an erasable programmable ROM (EPROM), an electrically erasable programmable ROM (EEPROM), a flash memory, a CD-ROM, or other portable memory storage.

The device 200 may also include a bus 203 providing communication among components of the device 200, including those components discussed above. The bus 203 may be any suitable bus architecture including, for example, a memory bus, a peripheral bus or a video bus.

It will be appreciated that various components and operations described herein can be implemented on multiple separate devices or systems in some embodiments. In such examples, the bus 203 may be a network link or other communication link enabling communication between multiple devices or components of the system.

In some embodiments, one or more of the operations of the VSR software system 222 described herein may be performed by hardware logic instead of software, for example by including as part of the device 200 one or more application-specific integrated circuits (ASICs) or field programmable gate arrays (FPGAs) configured to perform the described operations. For example, the modified video decoder 302 shown in FIG. 3 may be implemented as a hardware decoder in some embodiments.

Machine Learning

Machine Learning (ML) is an artificial intelligence technique in which algorithms are used to construct or build a "model" for a specific task from sample data that is capable of being applied to new input data to perform the specific task (i.e., making predictions or decisions based on new input data) without being explicitly programmed to perform the specific task.

As used herein, "model" shall refer to a machine learned model. A machine learned model refers to an executable computational structure, such as processor-executable software instructions, that can be executed. During training of the model, the parameters of the model are learned using sample data (e.g. data from a training dataset). Once the model has been trained, the trained model can be deployed and operated in an inference mode (e.g. applied to new input data) to perform the specific task (i.e. make predictions or decisions based on the new input data).

The machine learned models described herein may be approximated by differentiable convolutional neural networks that have been trained (e.g., using supervised learning) to perform a task, such as motion vector map refinement, super-resolution image reconstruction, HF feature transfer, LR feature extraction, or feature fusion.

However, it will be appreciated that various embodiments of the systems, devices, and methods described herein may be equally applicable to other tasks described herein, other neural network architectures (such as fully connected or recurrent neural networks), and other machine learning techniques, including other deep learning techniques, with appropriate changes to certain operations. Furthermore, some of the embodiments of the systems, devices, and methods described herein may have applications outside of the machine learning context.

The structure and operation of the VSR software system 222 will now be described with reference to FIGS. 3-11. The schematic diagrams of the VSR software system 222 and its modules and submodules in FIGS. 3-8B will be described in connection with the steps and operations of the methods performed thereby, shown in the flowcharts of FIGS. 9A-9D. An alternative embodiment of the non-key frame SR module of FIG. 5, whose operations are shown in the flowchart of FIG. 9C, will then be described with reference to the schematic diagram of FIG. 10 and the flowchart of FIG. 11 showing the operations thereof.

VSR Software System

Figure 3:
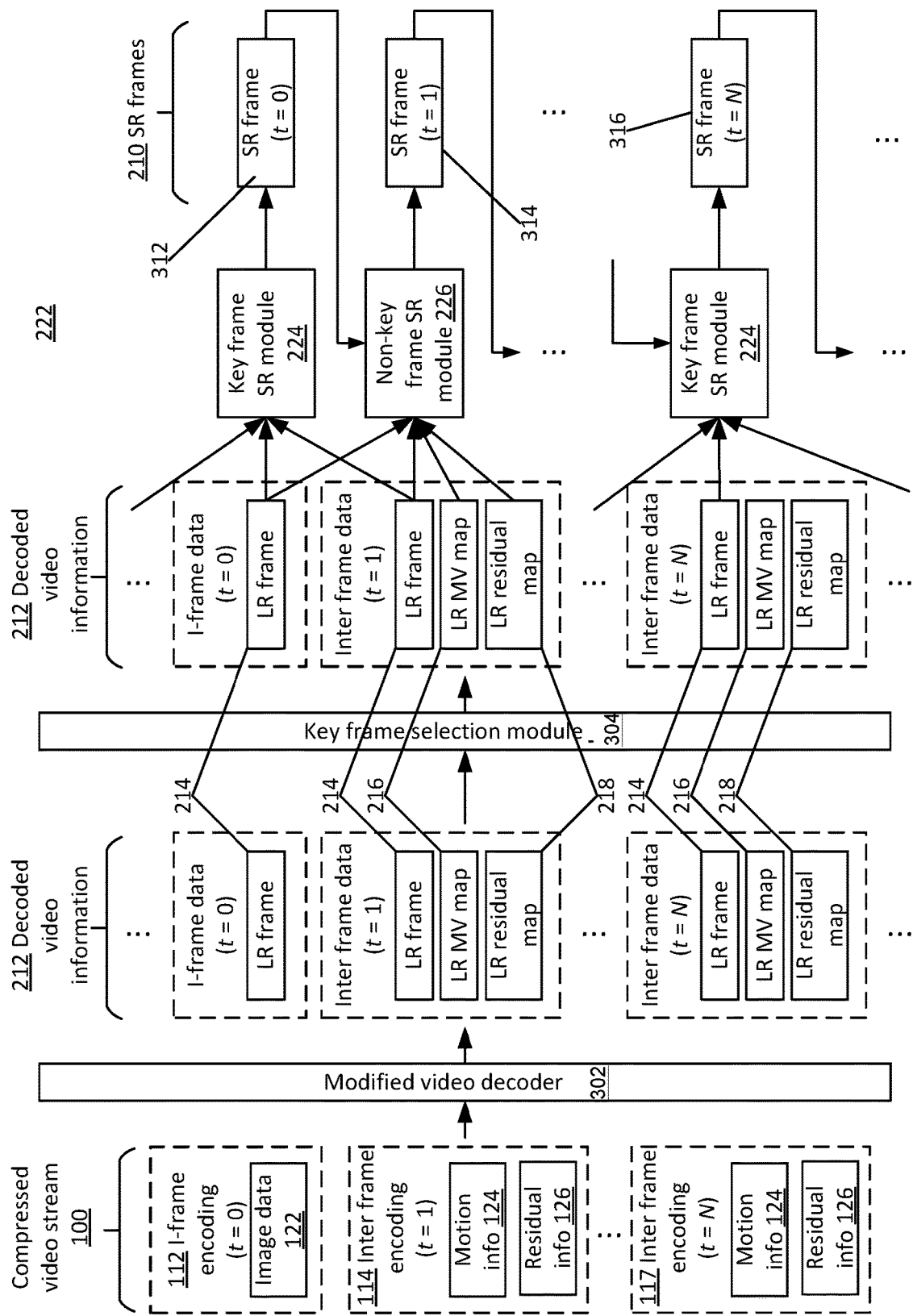
FIG. 3 is a schematic diagram of an example video super-resolution (VSR) software system according to example embodiments described herein.

FIG. 3 is a schematic diagram showing data flows of an example video super-resolution (VSR) software system 222 as implemented by the processor 202. The VSR software system 222 takes a low-resolution (LR) video stream, shown as compressed video stream 100, as input. The VSR software system 222 outputs the SR frames 210 (i.e., super-resolution images) for each frame of the video encoded in the compressed video stream 100. A modified video decoder 302 is used to output decoded video information 212 including not only decoded images (i.e. LR frames 214), but also motion vector (MV) maps 216 and residual maps 218 for all frames except the I-frames (such as a first I-frame encoded in first I-frame encoding 112). A key frame selection module 304 categorizes all frames decoded from the compressed video stream 100 a key frames or non-key frames, as described below. The decoded video information 212 of each key frame is processed by a key frame SR module 224 to generate the corresponding SR versions of the key frames, and non-key frame SR module 226 processes the decoded video information 212 of each non-key frame to generate the corresponding SR versions of the non-key frames.

Figure 9A:
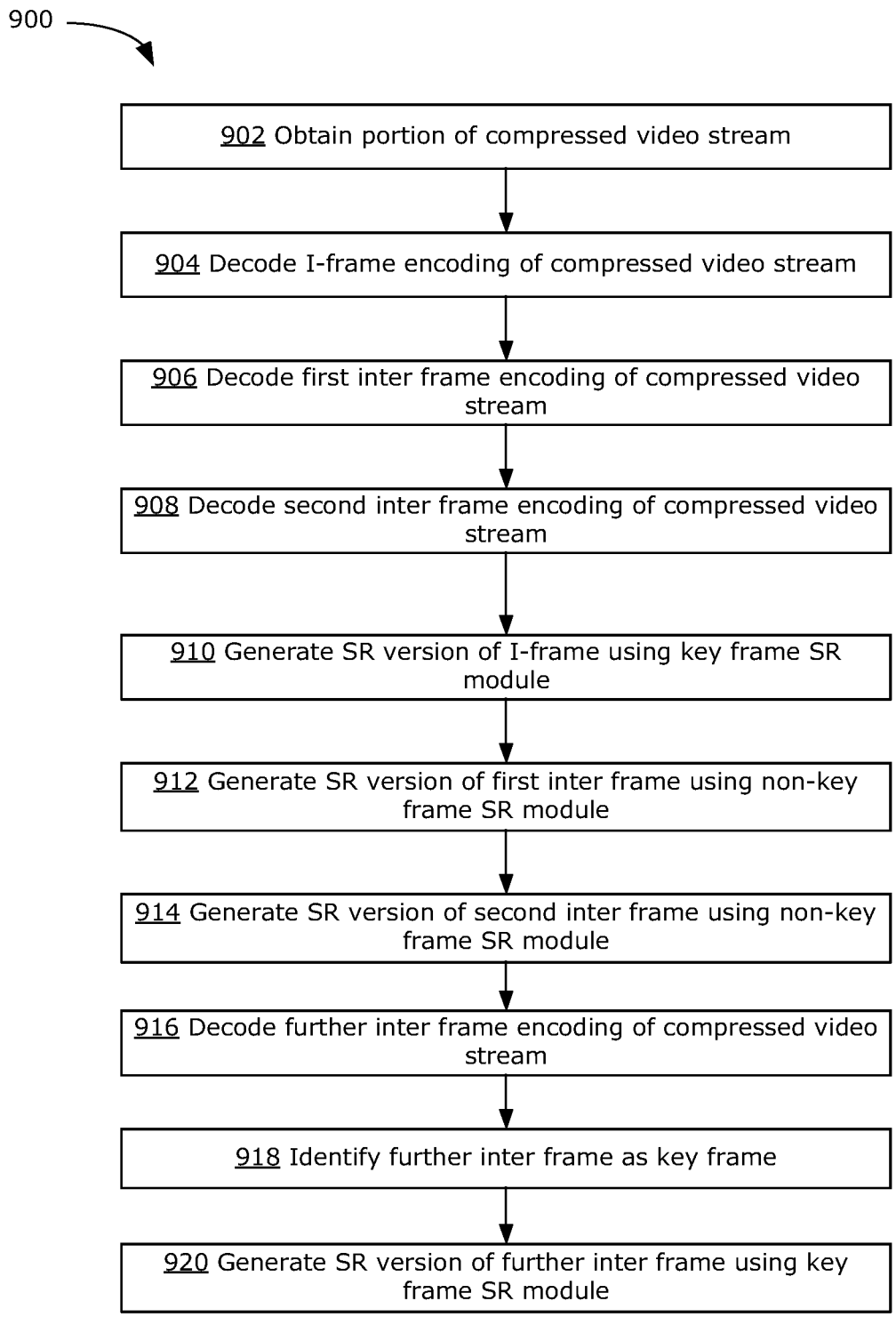
FIG. 9A is a high-level flowchart of an example method for generating a super-resolution version of a compressed video stream according to example embodiments described herein.

FIG. 9A is a high-level flowchart of an example method 900 for generating a super-resolution version of a compressed video stream. The steps of method 900 will be described with reference to the VSR software system 222 of FIG. 3. It will be appreciated that the method 900 may be implemented using other means in some embodiments.

At 902, at least a portion of the compressed video stream 100 is obtained. For example, the processor 202 may obtain the compressed video stream 100, or a portion thereof including one or more frame encodings, from the memory 208. As described above with reference to FIG. 1, the compressed video stream includes a plurality of frame encodings representative of a temporal sequence of frames, with the temporal sequence represented in FIG. 3 extending downward vertically from the first I-frame encoding 112. The plurality of frame encodings include an I-frame encoding (e.g., first I-frame encoding 112 shown in FIG. 3), representative of an I-frame (e.g., the first I-frame at time $t=0$ in the temporal sequence), as well as one or more inter frame encodings representative of inter frames subsequent to the I-frame in the temporal sequence. The inter frame encodings in this example include a first inter frame encoding (e.g., first inter frame encoding 114) representative of a first inter frame subsequent to the I-frame in the temporal sequence (immediately subsequent, in this example); a second inter frame encoding (not shown in FIG. 3, but implied in the ellipsis . . . below first inter frame encoding 114, and potentially represented by second inter frame encoding 116 in FIG. 1) representative of a second inter frame subsequent to the first inter frame in the temporal sequence (e.g., immediately subsequent at t=2, as in the example of second inter frame encoding 116 in FIG. 1, or non-immediately subsequent at t=3 or more); and a further inter frame encoding (e.g. further inter frame encoding 117) representative of a further inter frame subsequent to the second inter frame in the temporal sequence (at t=N in the temporal sequence). Each inter frame encoding includes motion information 124 and residual information 126 defined relative to an earlier frame in the temporal sequence: for example, the first inter frame motion information 124 and residual information 126 are relative to the first I-frame; the second inter frame motion information 124 and residual information 126 are relative to the first inter frame; and the further inter frame motion information 124 and residual information 126 are relative to a prior frame in the temporal sequence, such as an immediately prior frame at t=(N−1).

At 904, the I-frame encoding 112 is decoded by the modified video decoder 302 to generate the I-frame (i.e. the LR image 214 of the I-frame data of the decoded video data 212 at t=0).

At 906, the first inter frame encoding 114 is decoded by the modified video decoder 302 to generate three types of data: the first inter frame (i.e. the LR image 214 of the first inter frame data of the decoded video data 212 at t=1); the motion information of the first inter frame (i.e. the LR MV map 214 of the first inter frame data of the decoded video data 212 at t=1); and the residual information of the first inter frame (i.e. the LR residual map 216 of the first inter frame data of the decoded video data 212 at t=1).

At 908, the second inter frame encoding (e.g., 116 from FIG. 1) is decoded by the modified video decoder 302 to generate the same three types of data as step 906: the second inter frame (i.e. the LR image 214 of the second inter frame data of the decoded video data 212 at t=2 or more); the motion information of the second inter frame (i.e. the LR MV map 214 of the second inter frame data of the decoded video data 212 at t=2 or more); and the residual information of the second inter frame (i.e. the LR residual map 216 of the second inter frame data of the decoded video data 212 at t=2 or more).

After frame encodings are decoded by the modified video encoder 302, the key frame selection module 304 operates to select key frames from the decoded video data 212, i.e. to classify decoded frames as either key frames or non-key frames. In some examples, the key frame selection module 304 may perform its categorization based on characteristics of the compressed video stream 100 prior to decoding by the modified video encoder 302, for example based on characteristics of the GOPs or frame encodings of the compressed video stream 100, or based on metadata included in or associated with the compressed video stream 100. However, as shown in FIG. 3, the key frame selection module 304 performs its categorization on the decoded video data 212.

The key frame selection module 304 always categorizes I-frames as key frames. In some examples, the key frame selection module 304 may also identify, select, or categorize some inter frames of a GOP as key frames. For example, the key frame selection module 304 may select key frames at regular intervals within the sequence of inter frames of a GOP: in the example shown in FIG. 3, every Nth inter frame is selected as a key frame, wherein N may be any positive integer greater than 2. In some examples, the value of N may be set by a user of the device 200 or by a configuration setting indicating a video quality level: lower values of N may potentially result in higher-quality SR video, but may require greater computational resources. Because key frames are used to generate SR versions of themselves by a key frame SR module 224, using computationally-intensive techniques corresponding to existing multi-frame VSR approaches in some embodiments, a value of N=1 may result in the VSR software module 222 operating essentially in accord with existing multi-frame VSR approaches, and may not exhibit the computational efficiencies described herein.

Other than the initial I-frame and each Nth inter frame of a GOP, each other inter frame of a GOP is categorized by the key frame selection module 304 as a non-key frame.

Thus, returning to FIG. 9A, at 910 the I-frame (i.e. the LR image 214 of the I-frame data of the decoded video data 212 at t=0) is processed by the key frame SR module 224 to generate a super-resolution version of the I-frame. The key frame SR module 224 generates the SR version of the I-frame by processing the I-frame, the first inter frame, and an additional frame decoded from the compressed video stream 100, the additional frame being prior to the temporal sequence of frames. For example, if the frame encodings 112, 114, . . . 117 shown in FIG. 3 represent frame encodings of GOP 1 102 of FIG. 1, then a prior frame in the temporal sequence may be a frame selected from a prior GOP of the compressed video stream 100, such as the final inter frame of an immediately prior GOP located in the temporal sequence at t=−1. In some examples, such as examples in which the I-frame being processed is the first frame in the temporal sequence of the compressed video stream, the additional frame may be omitted from processing, according to known multi-frame approaches to VSR generation.

The operation of the key frame SR module 224 is described below with reference to FIG. 4. The SR version of the I-frame is generated as SR frame 312 at t=0 in the temporal sequence.

At 912, a super-resolution version of the first inter frame (i.e. the LR image 214 of the first inter frame data of the decoded video data 212 at t=1) is generated by the non-key frame SR module 226. The non-key frame SR module 226 processes the first inter frame, the motion information of the first inter frame (i.e. the LR MV map 214 of the first inter frame data of the decoded video data 212 at t=1), and the residual information of the first inter frame (i.e. the LR residual map 216 of the first inter frame data of the decoded video data 212 at t=1), as well as the I-frame (i.e. the LR image 214 of the I-frame data of the decoded video data 212 at t=0) and the super-resolution version of the I-frame (i.e. SR frame 312). The operation of the non-key frame SR module 226 is described below with reference to FIGS. 5 and 9B-9C. The SR version of the first inter frame is generated as SR frame 314 at t=1 in the temporal sequence.

At 914, a super-resolution version of the second inter frame (i.e. the LR image 214 of the second inter frame data of the decoded video data 212 at t=2 or more, not shown in FIG. 3) is generated by the non-key frame SR module 226, following the same procedure as at step 912. The non-key frame SR module 226 processes the second inter frame, the motion information of the second inter frame, and the residual information of the second inter, as well as the first inter frame and the super-resolution version of the first inter frame (i.e. SR frame 314).

At steps 916 through 920, a new key frame within the same GOP as the I-frame encoding 112 and first inter frame encoding 114 is decoded and processed to generate a SR version thereof.

At 916, the further inter frame encoding 117 is decoded by the modified video decoder 302 to generate the same three types of data as steps 906 and 908: the further inter frame (i.e. the LR image 214 of the further inter frame data of the decoded video data 212 at t=N); the motion information of the further inter frame (i.e. the LR MV map 214 of the further inter frame data of the decoded video data 212 at t=N); and the residual information of the further inter frame (i.e. the LR residual map 216 of the further inter frame data of the decoded video data 212 at t=N).

At 918, the key frame selection module 304 identifies the further inter frame as a key frame, as described above, based on the value of N and the position of the further inter frame in the temporal sequence (t=N).

At 920, as at step 910 above, the key frame SR module 224 is used to generate a SR version of the further inter frame by processing the further inter frame, at least one frame prior to the further inter frame in the temporal sequence (such as a decoded LR frame 214 at t=N−1) that has been decoded from the compressed video stream, and at least one frame subsequent to the further inter frame in the temporal sequence (such as a decoded LR frame 214 at t=N+1) that has been decoded from the compressed video stream. As noted at step 910, the operation of the key frame SR module 224 is described below with reference to FIG. 4. The SR version of the further inter frame is generated as SR frame 316 at t=N in the temporal sequence.

Figure 4:
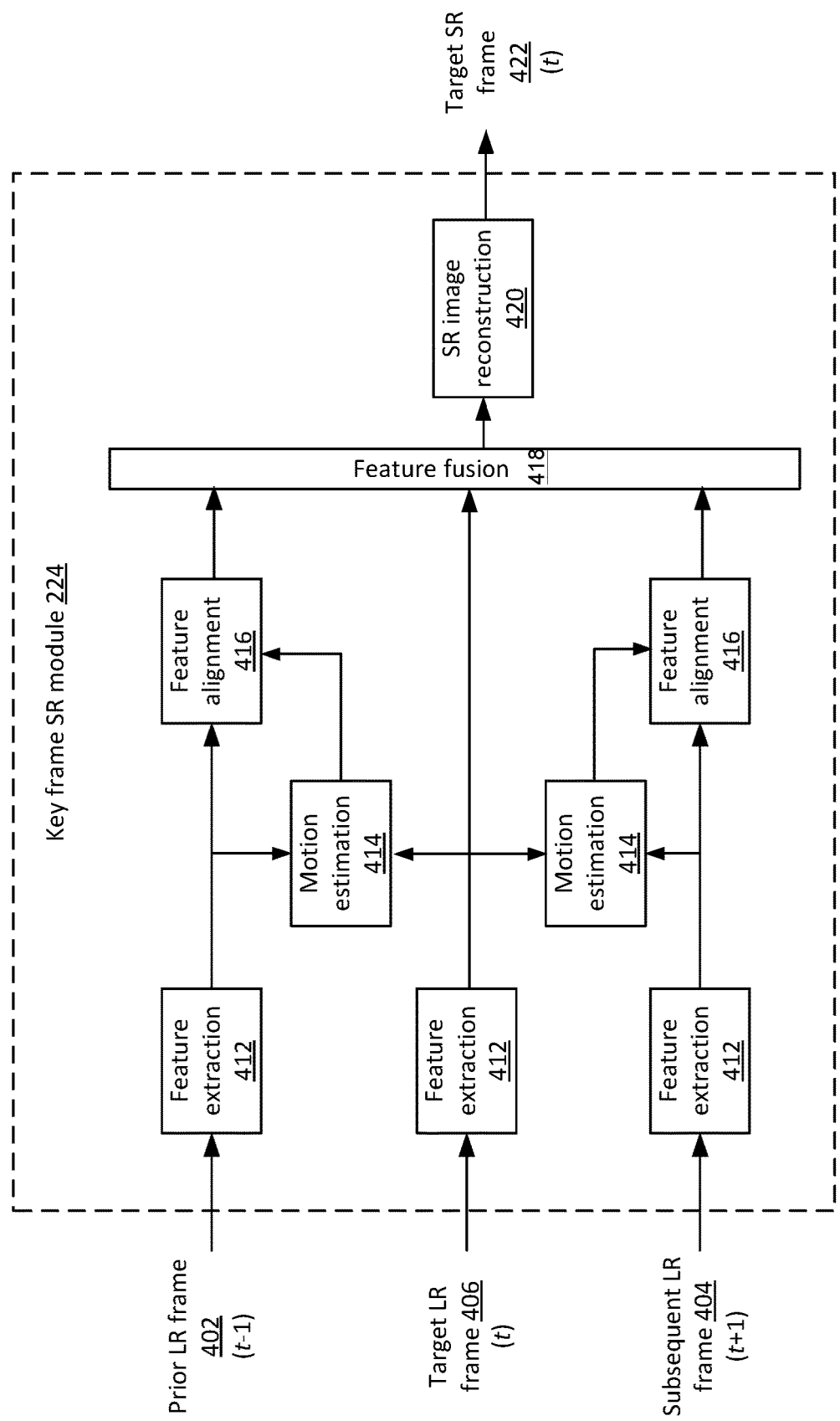
FIG. 4 is a schematic diagram of an example key frame super-resolution (SR) module of the VSR software system of FIG. 3.

FIG. 4 is a schematic diagram of an example key frame super-resolution (SR) module 224 of the VSR software system 222 of FIG. 3, which may be used for performing steps 910 and 920 of method 900. The key frame SR module 224 as shown in FIG. 4 operates substantially according to conventional multi-frame VSR techniques described above, and does not leverage the motion information and residual information included in the compressed video stream 100 to achieve greater computational efficiency than existing approaches to VSR. Instead, the computational efficiencies of the VSR software system 222 are achieved through the operations of the non-key frame SR module 226 described below.

The key frame SR module 224 receives as input a single LR image (i.e. the target LR frame 406 at time (t), i.e. the I-frame or other key frame) or multiple LR images (i.e. the target LR frame 406 as well as one or more prior frames, e.g. prior LR frame 402 at time (t−1) and/or subsequent frames, e.g. subsequent frame 404 at (t+1), in the temporal sequence). The key frame SR module 224 generates an SR version of the target frame, i.e. target SR frame 422 at time (t). Therefore, existing multi-frame approaches to VSR can be used to implement the key frame SR module 224 in various embodiments. The key frame SR module 224 may use existing multi-frame VSR techniques to produce high-quality SR frames for key frames. The embodiment shown in FIG. 4 uses a multi-frame VSR approach similar to that proposed in X. Wang, K. CK Chan, K. Yu, C. Dong, and C. C. Loy. "Edvr: Video restoration with enhanced deformable convolutional networks." In Proceedings of the IEEE/CVF Conference on Computer Vision and Pattern Recognition Workshops, pp. 0-0. 2019. ("Wang"). However, it is almost impossible to apply SOTA methods like those proposed in Wang to every frame of a received video stream, as the processing time or other computational resources required to do so is not available to most computationally-limited platforms. Instead, embodiments described herein apply the time-consuming techniques of the key frame SR module 224 only to key frames, which only account for approximately 1/N of total frames in a given compressed video stream 100, and instead apply the relatively light-weight and computationally efficient non-key frame SR module 226 to process non-key frames by leveraging the motion information 124 and residual information 126 encoded in compressed video streams 100.

The example embodiment of the key frame SR module 224 shown in FIG. 4 uses a feature extraction submodule 412 to extract or generate LR feature maps from each of the input LR frames (406 and optionally 402 and/or 404). The LR feature map generated for each prior LR frame 402 or subsequent LR frame 404 is compared to the LR feature map for the target frame 406 by a respective motion estimation submodule 414 to estimate the motion between each other frame 402, 404 and the target frame 406. The estimated motion information generated by each motion estimation submodule 414 is then used by a respective feature alignment submodule 416 to align the LR feature map for each respective prior LR frame 402 or subsequent LR frame 404 with the LR feature map for the target frame, thereby generating an aligned feature map for each respective prior LR frame 402 or subsequent LR frame 404. The aligned feature maps (i.e., the LR feature map for the prior frame and the LR feature map for the subsequent frame), together with the LR feature map for the target frame 406 (generated by the middle feature extraction submodule 412) are then provided as input to a feature fusion submodule 418, which fuses the aligned feature maps to generate a fused feature map. The fused feature map is used by a SR image reconstruction submodule 420 to generate the target SR frame 422, which is a SR version of the LR target frame 406. In the illustrated embodiment, the prior LR frame 402 and subsequent LR frame 404 used as inputs to the key frame SR module 224 are the immediately prior and immediately subsequent frames in the temporal sequence; however, in some examples other prior and/or subsequent frames may be used as well or in the alternative.

Figure 5:
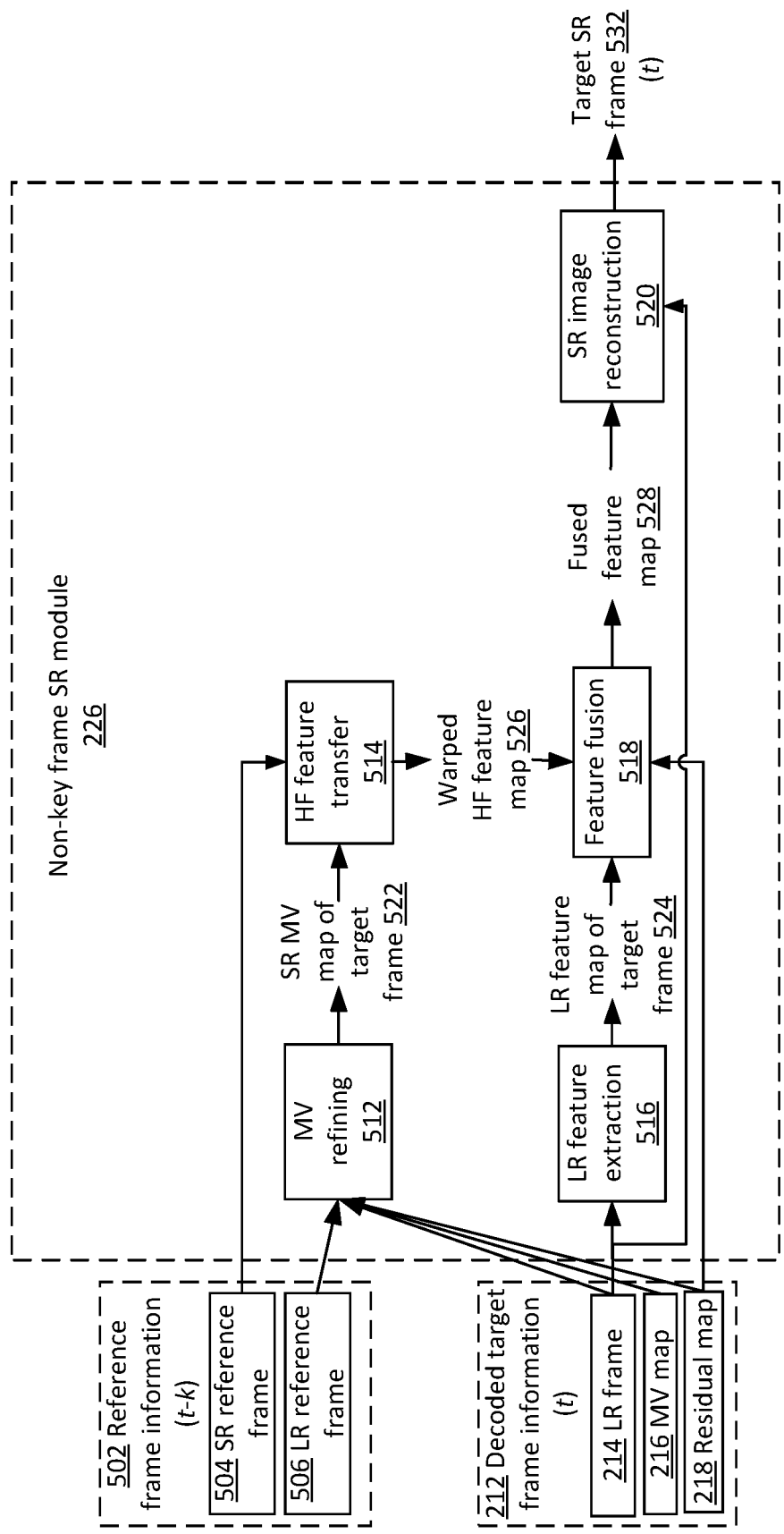
FIG. 5 is a schematic diagram of an example non-key frame SR module of the VSR software system of FIG. 3.

FIG. 5 is a schematic diagram of an example non-key frame SR module 226 of the VSR software system 222 of FIG. 3, which may be used for performing steps 912 and 914 of method 900. As described and shown in FIG. 3, the non-key frame SR module 226 receives as input the LR frame 214, MV map 216, and residual map 218 of the target frame (i.e. the target frame at time (t), i.e. the non-key inter frame being used to generate a SR version thereof) from the decoded frame data 212. The non-key frame SR module 226 also receives LR and SR versions of a reference frame decoded from the compressed video stream 100, shown as reference frame information 502 representative of a frame at (t-k) in the temporal sequence, including SR reference frame 504 and LR reference frame 506, wherein k is a positive integer that may be set as a configuration setting of the VSR software system 222. In some examples, k=1; for example, the reference frame used to generate a SR version of the first inter frame at (t=1) may be the I-frame at (t=0), i.e. (t−k=1−1=0). The non-key frame SR module 226 operates according to the steps shown in FIGS. 9B and 9C to generate a target SR frame 532, i.e. a SR version of the target frame.

In some embodiments, such as embodiments in which k=1, the non-key frame SR module 226 exploits the strong relationship between two neighboring frames to accelerate the generation of SR versions of non-key frames. Two neighboring frames in the temporal sequence are often very similar, so the reconstructed high-frequency (HF) textures of one frame (i.e. the reference frame) are very likely to be able to fit in the other frame (i.e. the target frame). Moreover, the MV maps and residual maps of the neighboring frames indicate the movement and similarity of local patches between the two frames, thereby enabling prediction of a position and extent to which the HF texture can be borrowed from the reference frame to improve the resolution of the target frame. By re-using the HF information from a reference frame and leveraging the free motion information from the compressed video stream 100, the non-key frame SR module 226 may be able to estimate reasonable high resolution details for the target frame at a much lower computational intensity than the non-key frame SR module 224. In other words, the non-key frame SR module 226 may be able to quickly and efficiently produce a SR version of the target frame by observing not only the decoded LR images of the target frame and reference frame, but also the motion vector map and residual map of the target frame and the SR version of the reference frame (generated by the key frame SR module 224 or non-key frame SR module 226).

In this embodiment shown in FIG. 5, the non-key frame SR module 226 is implemented with five submodules, each of which may be implemented as a differentiable convolutional neural-network (CNN). The submodules shown in FIG. 5 are the MV refining submodule 512, the HF feature transfer submodule 514, the LR feature extraction submodule 516, the feature fusion submodule 518, and the SR image reconstruction submodule 520.

Figure 9B:
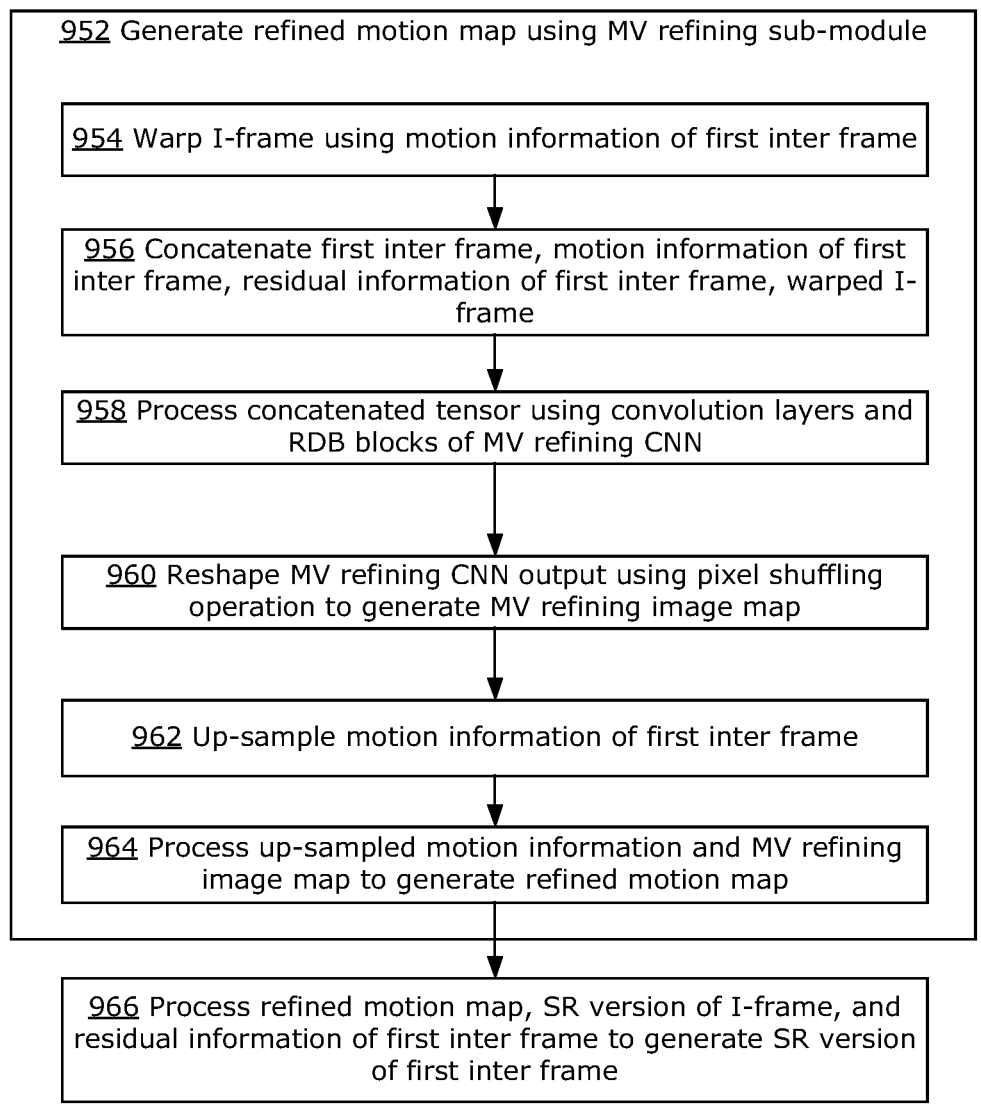
FIG. 9B is a flowchart showing example operations of the step of generating an SR version of an inter frame of FIG. 9A using the example non-key frame SR module of FIG. 5, showing detailed steps performed by the MV refining submodule of FIG. 5.

FIG. 9B is a flowchart showing example operations of the step 912 of generating an SR version of a first inter frame of FIG. 9A, using the example non-key frame SR module 226 of FIG. 5, and showing in particular the details of steps performed by the MV refining submodule 512 of FIG. 5. The steps of FIGS. 9B and 9C will be described with reference to an example in which the target frame being processed by the non-key frame SR module 226 is the first inter frame at t=1 in the temporal sequence (decoded from first inter frame encoding 114 in FIG. 3), and k=1 such that the reference frame is the I-frame at t=0 in the temporal sequence (decoded from I-frame encoding 112 in FIG. 3). It will be appreciated that the steps of FIGS. 9B and 9C are equally applicable to step 914 (for generating a SR version of the second inter frame) or to the generation of a SR version of any other non-key inter frame, with any value of k.

At 952, a refined motion map is generated using the motion vector (MV) refining submodule 512 of the non-key frame SR module 226 to generate a refined motion map, shown in FIG. 5 as the SR MV map of the target frame 522. Step 952 includes steps 954 through 964, all of which are performed by the MV refining submodule 512 and will be described below with reference to FIGS. 6A-6B.

At 966, the SR version of the target frame (e.g., the first inter frame) is generated by processing the refined motion map (i.e. the SR MV map of the target frame 522), the SR version of the reference frame (e.g., SR reference frame 504 representative of the first I-frame), and the residual information of the target frame (i.e. residual map 218 of FIG. 5). The details of step 966 are described below with reference to FIG. 9C. (An alternative embodiment of the non-key frame SR module, described with reference to FIG. 10 below, does not perform the steps of FIG. 9C but instead implements step 966 using the steps set out in FIG. 11.)

Figure 6A:
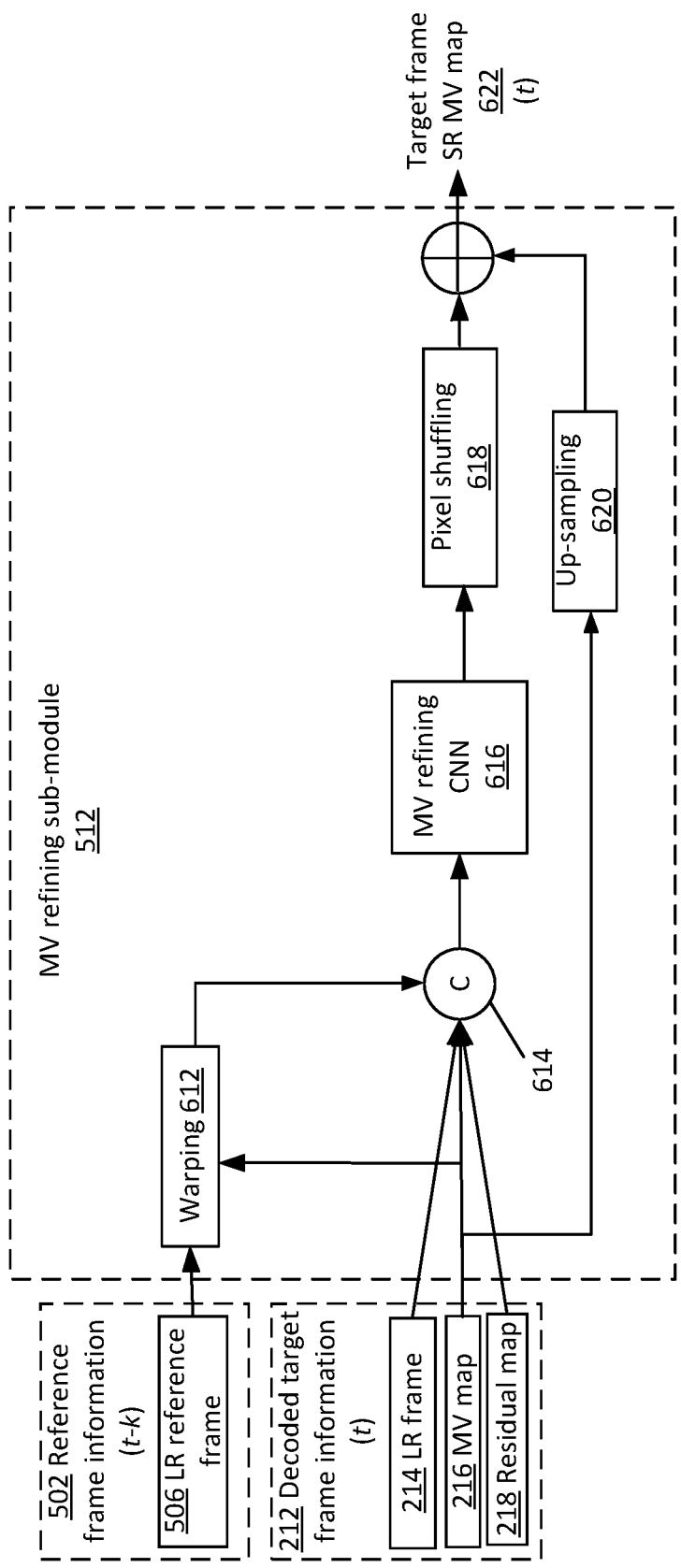
FIG. 6A is a schematic diagram of an example motion vector (MV) refining submodule of the non-key frame SR module 226 of FIG. 5.

FIG. 6A is a schematic diagram of an example motion vector (MV) refining submodule 512 of the VSR software system of FIG. 3, used to perform steps 954 through 964 of method 900 shown in FIG. 9B. The MV refining submodule 512 is trained or otherwise configured to predict the pixel correspondence between SR reference and target images. The MV refining submodule 512 uses the decoded LR reference frame 506 from the reference frame information 502, as well as decoded target frame information 212 (i.e. the LR frame 214 of the target frame, the MV map 216 of the target frame, and the residual map 218 of the target frame) as input, and outputs a target frame SR MV map 622.

For the purpose of this example, assume that the shape of the LR image of either the reference frame or the target frame is H×W×3, where H and W denote the pixel height and pixel width, respectively, of the LR frame, such that the pixel dimensions of the MV map 216 and residual map 218 are H×W×2 and H×W×3, respectively (i.e. 2 and 3 channels respectively).

Returning to FIG. 9B, at 954 a warping submodule 612 warps the LR reference frame 504 towards the target LR frame 214 using the LR MV map 216 of the target frame. Denoting the LR reference frame 506 as $I_r$, and the LR MV map 216 of the target frame as $M_r$, the warped reference frame $\tilde{I}_r$ generated by the warping submodule 612 can be computed as $\tilde{I}_r(p)=I_r(p+M_r(p))$.

At 956, a concatenation operation 614 concatenates all input tensors (the target LR frame 214, the MV map 216 of the target frame, the residual map 218 of the target frame, and the warped reference frame $\tilde{I}_r$) along their last dimension to generate a concatenated tensor. Therefore, the concatenated tensor is of the shape H×W×11.

Figure 6B:
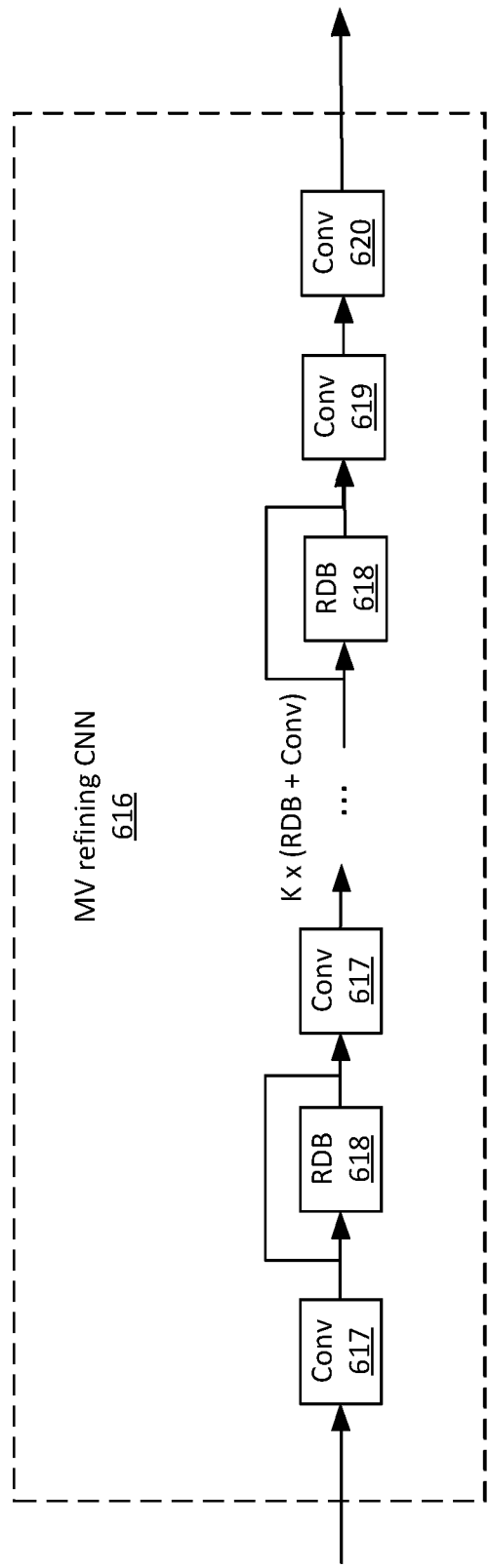
FIG. 6B is a schematic diagram of an example MV refining convolutional neural network (CNN) of the MV refining module of FIG. 6A.

At 958, the concatenated tensor is processed by a MV refining convolutional neural network (CNN) 616, shown in FIG. 6B.

FIG. 6B is a schematic diagram of an example MV refining CNN 616 of the MV refining module 512 of FIG. 6A. The MV refining CNN 616 includes at least a first convolution layer 617, followed by a residual dense block (RDB) 618, followed by K+1 additional pairs of convolution layer 617 and RDB blocks 618 in sequence (K is a positive integer), followed by two final convolution layers: a bottleneck convolution layer 619, and a final convolution layer 620. It will be appreciated that the multiple convolution layers 617 and multiple RDB blocks 618 in FIG. 6B, while denoted with identical reference numerals, may have different structures, learned parameter values, and other characteristics, from each other.

The concatenated tensor is first processed by the first convolutional layer 617 to expand the channel count from 11 to $c_1$ for richer feature representation, wherein $c_1$ is a preset hyperparameter of the MV refining CNN 616. Then the H×W×$c_1$ feature map is processed by a first residual dense block (RDB), as described in Y. Zhang, Y. Tian, Y. Kong, B. Zhong, and Y. Fu. "Residual dense network for image super-resolution." In Proceedings of the IEEE conference on computer vision and pattern recognition, pp. 2472-2481. 2018.

The outputs of each sequential convolutional layer 617 and RDB block 618 are added together, and the sum is provided as input to the next convolution layer in the sequence, in order to improve the efficiency of gradient back-propagation during training. The RDB blocks 618 are designed to preserve the number of channels between its input and output tensors, such that the output of the prior convolution layer 617 (i.e. the input of the RDB block 618) can be added element-wisely to the output tensor of the RDB block 618. As shown in FIG. 6B, K+2 RDB blocks 618 and K+2 convolutional layers 617 are used in the initial sequence, before a bottleneck convolution layer 619 processes the output of the final RBD block 618 and a final convolution layer 620 converts the channel count of the output tensor of the bottleneck convolution layer 619 from $c_1$ to $2 \times s^2$, wherein s denotes a scaling factor of the SR generation operation (e.g., the ratio of the SR image dimensions to the LR image dimensions. Thus, the output of the MV refining CNN 616, also referred to as the MV refining CNN output tensor, has $2 \times s^2$ channels.

Returning to FIG. 5 and FIG. 9B, at 960 the output of the MV refining CNN 616 (i.e. the MV refining CNN output tensor generated by the final convolution layer 620) is reshaped by a pixel-shuffling layer 618 to generate a reshaped MV refining tensor of the shape sH×sW×2.

At 962, an up-sampling submodule 620 is used to up-sample the motion information of the first inter frame (i.e. MV map 216) to generate up-sampled motion information, also of dimensions sH×sW×2. In some examples, the up-sampling submodule 620 uses an interpolation technique, such as bicubic interpolation, to up-sample the motion information.

At 964, the reshaped MV refining tensor and the up-sampled motion information are combined (e.g., values of the pixels or other elements at each location of each channel are summed) to generate the refined motion map of dimensions sH×sW×2.

As described in the Machine Learning section above, all modules and submodules of the VSR software system 222 that include CNNs or other neural network structures, including the MV refining submodule 512 and its sub-submodules such as the MV refining CNN 616 and the pixel-shuffling layer 618, may be trained using supervised training. In the course of training the MV refining submodule 512, the refined motion map generated by the MV refining submodule 512 may be forced to match the ground-truth MV map defining the motion vectors between a SR reference frame 504 and a target SR frame 532 included in each training data sample used to train the MV refining submodule 512. The MV refining submodule 512 described above with reference to FIG. 6A is similar to the motion estimation module 414 of FIG. 4, but can be much faster than the motion estimation module 414 because the LR MV map 216 provides a much better initialization point.

Returning to FIG. 5, the refined MV map output of the MV refining submodule 512 is shown as the SR MV map of the target frame 522. FIG. 9C described steps performed by the other submodules of the non-key frame SR module 226 to process the SR MV map of the target frame 522 and other inputs to generate the target SR frame 532.

FIG. 9C is a flowchart showing example operations of the step 966 of method 900 of generating an SR version of a non-key target frame (such as the first inter frame) using the example non-key frame SR module 226 of FIG. 5, based on the refined MV map generated by the MV refining submodule 512.

At 972, the refined motion map 522 (i.e. the SR MV map of the first inter frame, generated by the MV refining submodule 512) and the SR reference frame 504 (e.g., the SR version of the first I-frame) are processed by a high-frequency (HF) feature transfer submodule 514 to generate a warped HF feature map 526. The operations of the HF feature transfer submodule 514 are described below with reference to FIG. 7.

At 974, the target LR frame 214 (e.g., first inter frame) is processed by a LR feature extraction submodule 516 to generate a LR feature map 524 of the target frame (e.g., first inter frame). In some embodiments, the LR feature extraction submodule 516 consists of two convolution layers, which convert the input LR frame 214 (a tensor of dimensions H×W×3), to a content-aware LR feature map represented by a tensor of dimensions H×W×$c_3$, wherein $c_3$ is a pre-set hyperparameter of the VSR software system 222.

At 976, the LR feature map 524 of the target frame (e.g., first inter frame), the warped HF feature map 526, and the residual information of the target frame (e.g., the residual map 218 of the first inter frame) are processed by a feature fusion submodule 518 to generate a fused feature map 528.

The feature fusion submodule 518 is trained or otherwise configured to fuse the LR feature map 524 of dimensions (H×W×$c_3$), the warped HF feature map 526 of dimensions (H×W×$s^2 c_2$), and the LR residual map 218 of dimensions (H×W×3) of the target frame into a single fused feature map 528. In some embodiments, the feature fusion submodule 518 is composed of a concatenation operation followed by a convolution layer. The concatenation operation first concatenates the three input maps 524, 526, 218 to a large tensor of dimensions H×W×($c_3+s^2 c_2+3$), and then the convolution layer transforms this large tensor into a fused feature map 528 of dimensions H×W×$c_4$, wherein $c_4$ is a pre-set hyperparameter of the VSR software system 222.

At 978, the fused feature map 528 and the LR target frame 214 (e.g., the first inter frame) are processed by a SR image reconstruction submodule 520 to generate the target SR frame 532 (e.g., the SR version of the first inter frame). The SR image reconstruction submodule 520 is described below with reference to FIGS. 8A-8B.

Figure 7:
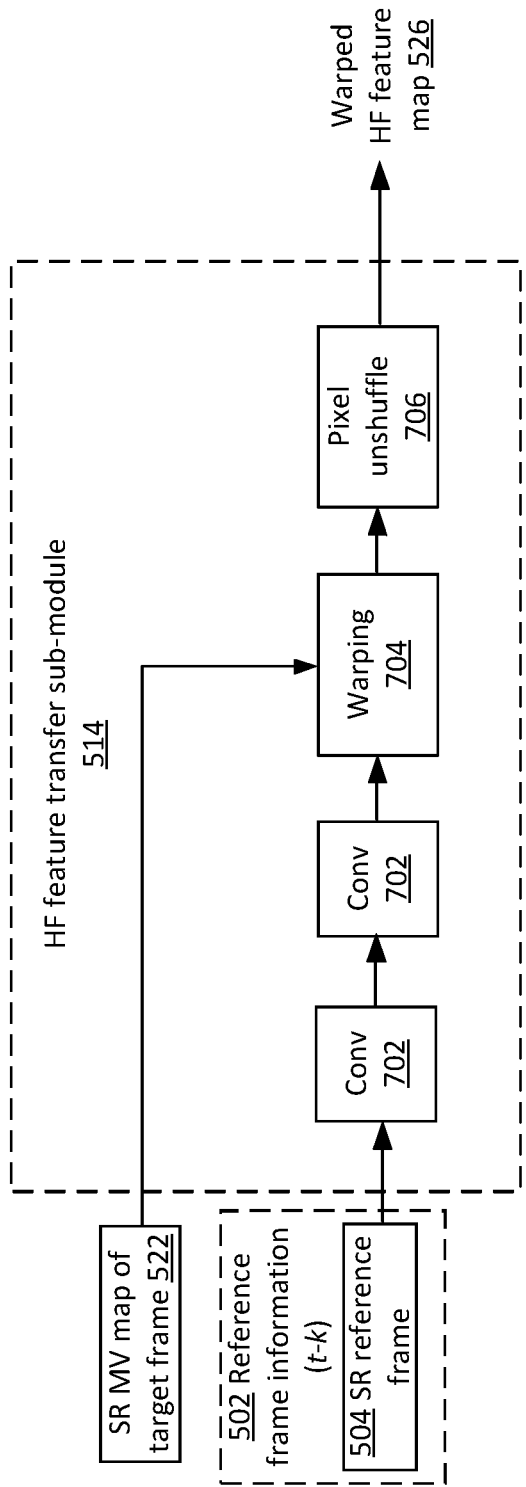
FIG. 7 is a schematic diagram of an example high-frequency (HF) feature transfer submodule of the non-key frame SR module 226 of FIG. 5.

FIG. 7 is a schematic diagram of an example high-frequency (HF) feature transfer submodule 514 of the non-key frame SR module 226 of FIG. 5. The HF feature transfer submodule 514 is trained or otherwise configured to extract HF features from the SR reference frame 504, and transfer the extracted HF features of the reference frame to a SR MV map 522 of the target frame. The HF feature transfer submodule 514 receives two inputs: the SR MV map 524 of the target frame (e.g., the first inter frame) produced by the MV refining submodule 512, and the SR reference frame 504, which has already been generated by the key frame SR module 224 (for key frames such as I-frames) or the non-key frame SR module 226 (for non-key frames). In this example, the SR MV map 522 is a tensor of dimensions sH×sW×2, while the SR reference frame 504 is of dimensions sH×sW×3.

Figure 9C:
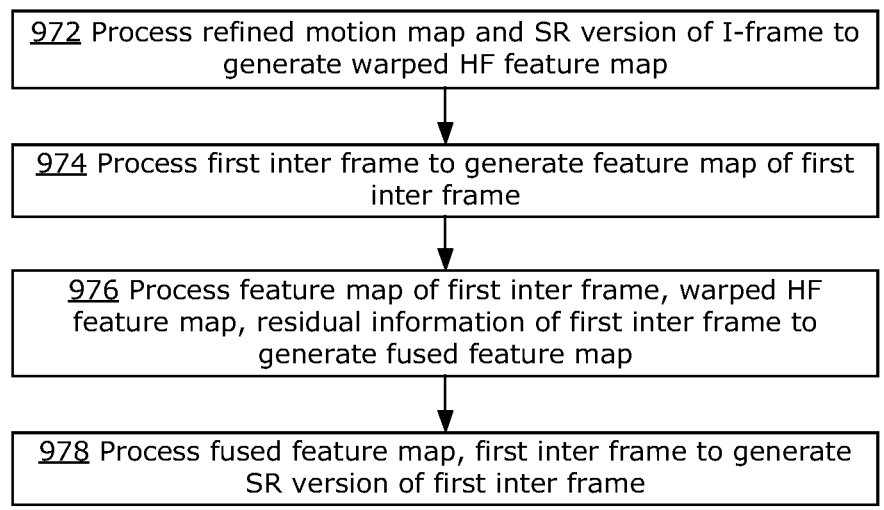
FIG. 9C is a flowchart showing example operations of the step of generating an SR version of an inter frame of FIG. 9B using the example non-key frame SR module of FIG. 5, based on the refined MV map as shown in FIG. 9B.
Figure 9D:
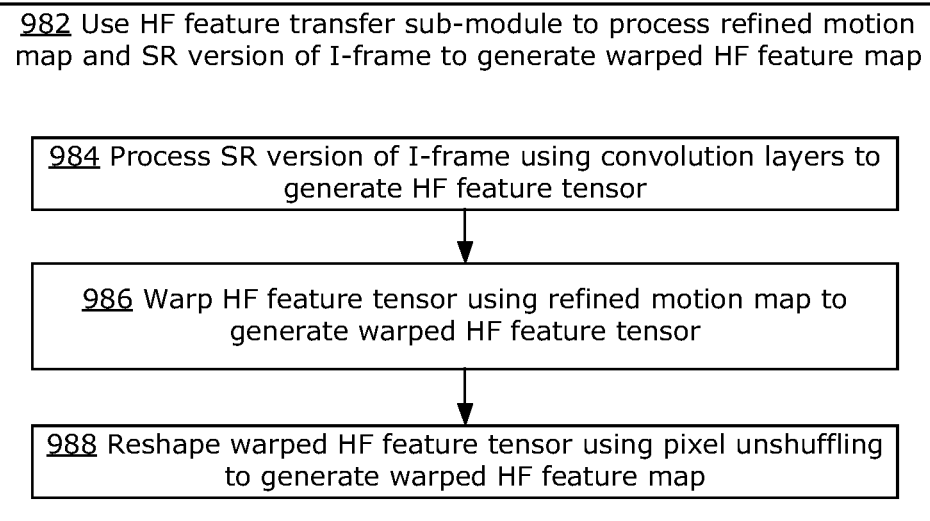
FIG. 9D is a flowchart showing example operations of the step of generating a warped HF feature map of FIG. 9C using the example HF transfer submodule of FIG. 7.

FIG. 9D is a flowchart showing example operations of the step 972 of method 900 of generating a warped HF feature map 526 using the example HF transfer submodule 514 of FIG. 7. In this example, the generating a warped HF feature map 526 is generated at step 982 by using the HF feature transfer submodule 514 of the non-key frame SR module 226 to process the SR reference frame 504 (e.g., the SR version of the I-frame) and the SR MV map 524 of the target frame (e.g., the first inter frame). Step 982 includes sub-steps 984-988.

At 984, the SR reference frame 504 is processed using one or more convolution layers to generate a HF feature tensor. In the example of FIG. 7, the SR reference frame 504 is processed by two convolution layers 702 to generate a HF feature tensor of dimensions sH×sW×$c_2$, wherein $c_2$ is a pre-set hyperparameter of the VSD software system 222.

At 986, the SR MV map 522 is used by a warping submodule 704 to warp the HF feature tensor (generated by the two convolution layers 702) towards the target frame (e.g., the first inter frame). The warping operation performed by the warping submodule 704 may be the same operation as the one described above with reference to the MV refining module 512. The output of the warping submodule 704 may be referred to as the warped HF feature tensor.

At 988, a pixel-unshuffle submodule 706 is used to reshape the warped HF feature tensor, or dimensions sH×sW×$c_2$, to a warped HF feature map 526 of dimensions H×W×$s^2 c_2$. The warped HF feature map 526, which is also the output of the HF feature transfer submodule 514, thus has the same spatial resolution as the LR frame 214 but contains HF information transferred from the SR reference frame 504.

Figure 8A:
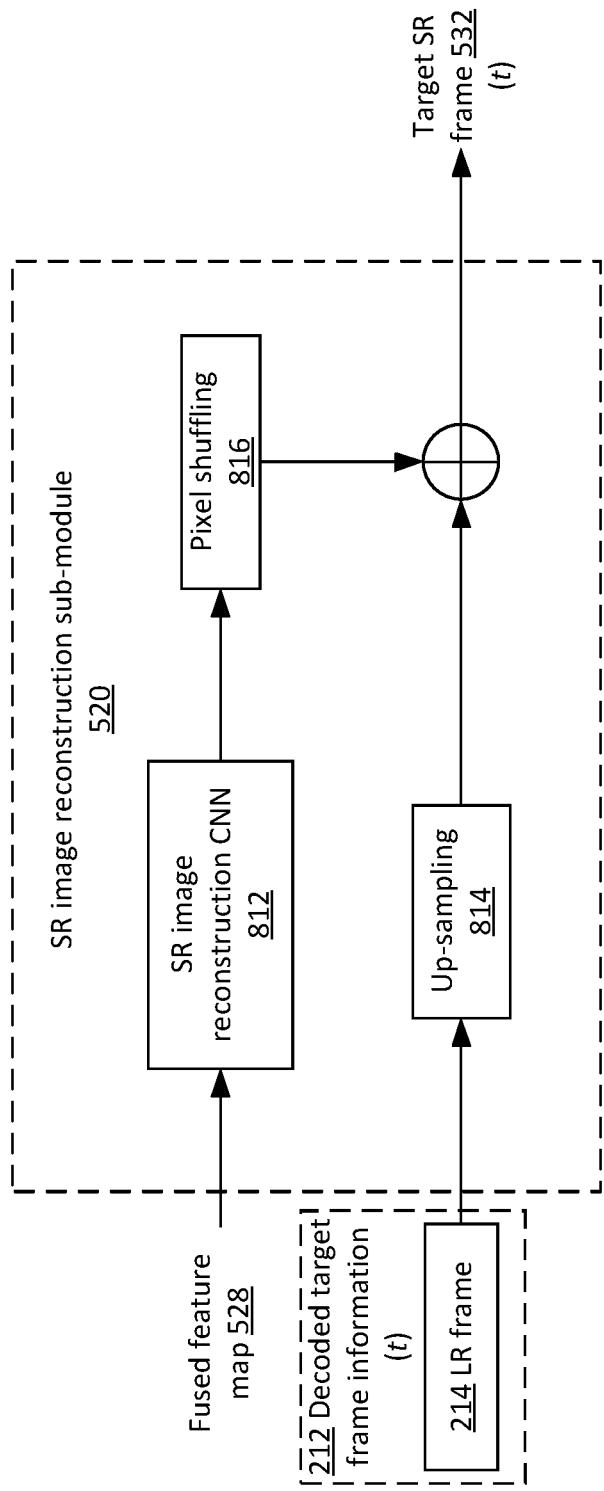
FIG. 8A is a schematic diagram of an example SR image reconstruction submodule of the non-key frame SR module 226 of FIG. 5.

FIG. 8A is a schematic diagram of an example SR image reconstruction submodule 520 of the non-key frame SR module 226 of FIG. 5. The SR image reconstruction submodule 520 is trained or otherwise configured to reconstruct an SR image for the target frame by estimating reasonable HF details from the fused feature map 528, and thereby to perform the final step 978 of method 900 described above with reference to FIG. 9C. In some embodiments, such as the embodiment shown in FIG. 8A, the SR image reconstruction submodule 520 has a similar architecture to that of the MV refining submodule 512.

Figure 8B:
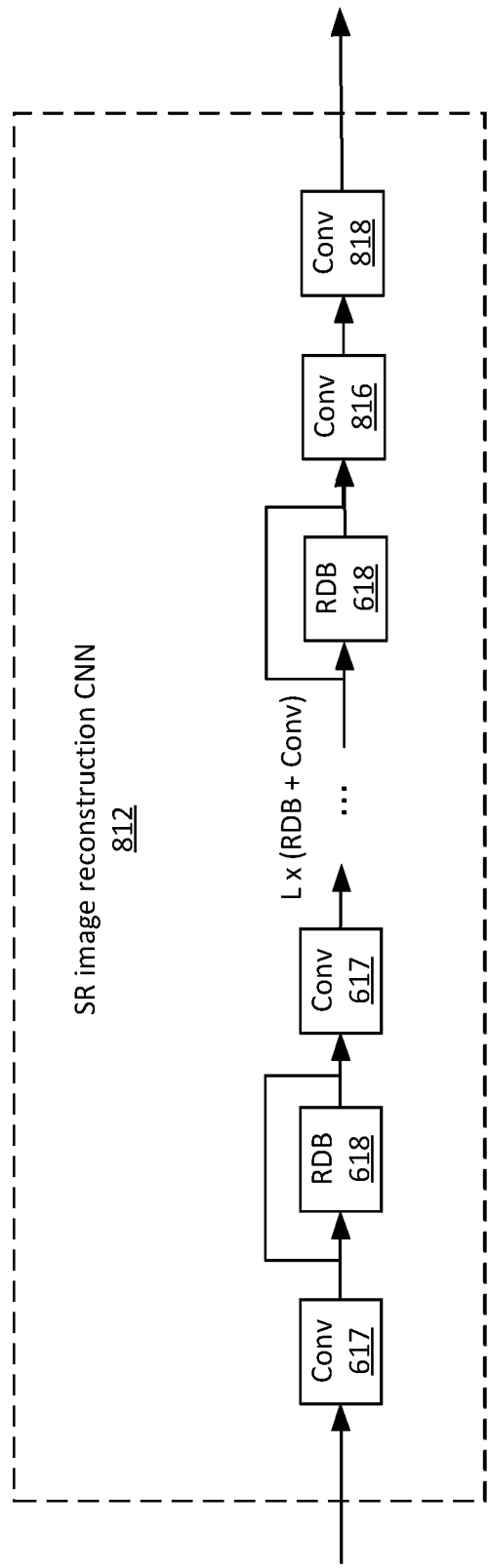
FIG. 8B is a schematic diagram of an example SR image reconstruction convolutional neural network (CNN) of the SR image reconstruction submodule of FIG. 8A.

The fused feature map 528 is received by the SR image reconstruction submodule 520 and processed initially by a SR image reconstruction CNN 812. FIG. 8B is a schematic diagram of an example SR image reconstruction convolutional neural network (CNN) 812 of the SR image reconstruction submodule 520. The SR image reconstruction CNN 812 has the same structure as the MV refining CNN 616 described above with reference to FIG. 6B, but the number of the RDB-block-and-convolution-layer pairs in the sequence is L+2, wherein L is a pre-set hyperparameter of the VSD software system 222. As in the MV refining CNN 616, each illustrated convolution block 616 and each illustrated RDB block 618 may differ in structure and/or in other characteristics from each of the others. The output of the SR image reconstruction CNN 812 has the same dimensions as the fused feature map 528. The final convolution layer 818 following the bottleneck convolution layer 816 transforms the H×W×$c_4$ tensor output of the bottleneck convolution layer 816 to a H×W×$3s^2$ tensor.

Returning to FIG. 8A, the H×W×$3s^2$ tensor generated by the SR image reconstruction CNN 812 is reshaped by a pixel-shuffling layer 816 to a pixel-shuffled tensor of dimensions sH×sW×3. In parallel, the target LR frame 214 is up-sampled by an up-sampling submodule 814, for example using bicubic up-sampling, to generate an up-sampled target frame.

The pixel-shuffled tensor output of the pixel-shuffling layer 816 is then added to the up-sampled target frame to generate the target SR frame 532 (e.g., the SR version of the first inter frame).

As described above, each module and submodule of the example non-key frame SR module 226 described herein may be implemented with back-propagation compatible CNNs, thereby making it possible to train all the modules and sub-modules end-to-end. However, in some embodiments, the MV refining submodule 512 may be trained first by minimizing the residual between the warped reference frame I, (generated by the warping submodule 612) and the SR version of the target frame (i.e., the ground truth SR target frame image obtained from the training dataset). The MV refining submodule 512 may then be frozen (i.e., its learned parameter weights may be fixed in value without further updating) while the other submodules are trained in an end-to-end manner.

Thus, the VSR acceleration framework provided by the VSR software system 222 described above divides a video (e.g., compressed video stream 100) into key frames and non-key frames and processes them differently. The key frames are up-scaled by the key frame SR module 224, which may use the existing VSR model of Wang. While this model achieves visually pleasing, high-quality SR results, it runs at a speed far behind real-time, making it infeasible to deploy this model to enhance the resolution of every frame in the video. The proposed VSR software system 222 allows a computing platform (such as device 200) to use this model only on a small fraction of video frames, and then efficiently propagates the SR image information of these key frames to other non-key frames by leveraging the MV maps and residual maps encoded in the compressed video stream 100.

Using the First Example Non-Key Frame SR Module 226

Existing multi-frame VSR approaches achieve high image quality because 1) they can combine information from multiple neighboring frames, and 2) they employ increasingly larger CNNs to fit complex real-world HF textures. Embodiments described herein may improve processing speed and reduce computational intensity by removing excessive computations from one or both of these two aspects.

First, in order to correctly combine information from different frames, it is extremely important to accurately estimate the correspondence between the two frames for every location. To this end, the MVs in a video stream provide free but informative hints for aligning two neighboring frames, and the residual maps offer additional information regarding the confidence level of the alignment at each pixel location. With the help of the MV and residual maps, embodiments described herein are able to use a much lighter network to align neighboring frames, and thus save total inference time of the model (i.e. total processing time to generate the SR frames of the video).

Second, in order to learn a perfect mapping from LR content to its HF details, existing multi-frame VSR models generally employ large and deep CNNs for their strong approximation capability. However, the adoption of a large CNN model significantly adds to the total processing time as it will be executed on every frame in the video. On the other hand, neighboring frames in the same video are often similar to each other, meaning that re-estimating the HF details for every frame may be a waste of computing resources and time. Embodiments described herein may provide a mechanism to re-use the HF details estimated in key frames to facilitate the SR generation task for non-key frames. As the generated SR key frames provide a highly informative prior, example embodiments described herein may be able to employ a relatively light-weighted SR image reconstruction submodule 520 to achieve similar performance to existing multi-frame VSR models.

In other words, example embodiments described herein exploit the MV maps and residual maps that are readily available in video streams to save computations from the abovementioned two aspects of existing multi-frame VSR approaches, and thus can accelerate performance relative to existing multi-frame VSR models without compromising the visual quality of reconstructed SR images.

Alternative Example Non-Key Frame SR Module

An alternative implementation of the non-key frame SR module 226 is now described with reference to FIGS. 10-11. The alternative non-key frame SR module 226A may achieve even greater reduction in computational intensity than the first example embodiment 226, but potentially at the cost of slightly lower image quality of SR images of non-key frames. The alternative non-key frame SR module 226A makes a more aggressive assumption than the first example embodiment 226 that the high-frequency (HF) details will stay the same despite the motion between two neighboring frames. With this assumption, the alternative non-key frame SR module 226A directly operates on SR images in the pixel domain, saving a great number of convolutional layers and thereby potentially achieving much faster processing speed than the first example embodiment 226. However, the quality of the resulting SR non-key frames may also degrade.

Figure 10:
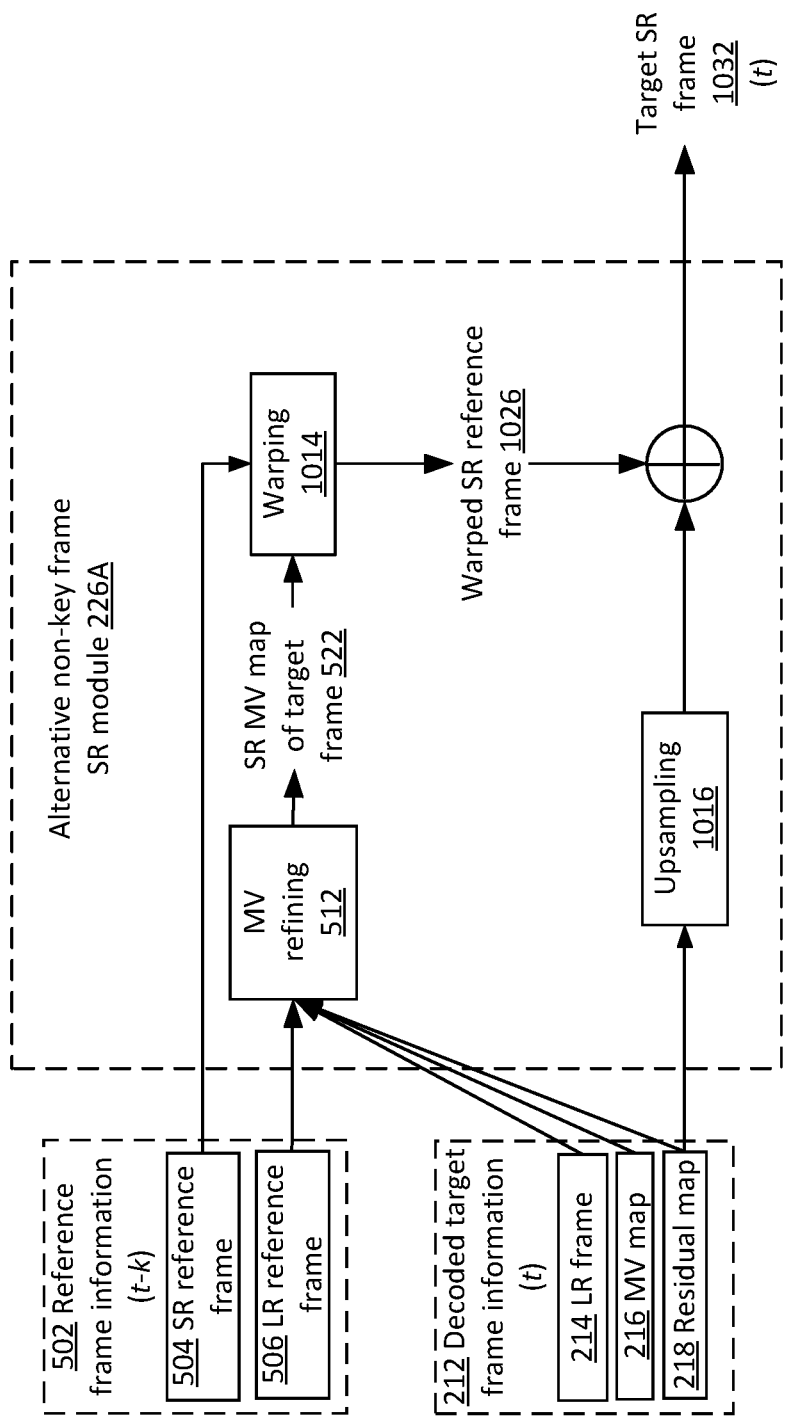
FIG. 10 is a schematic diagram of an alternative example non-key frame SR module of the VSR software system of FIG. 3.
Figure 11:
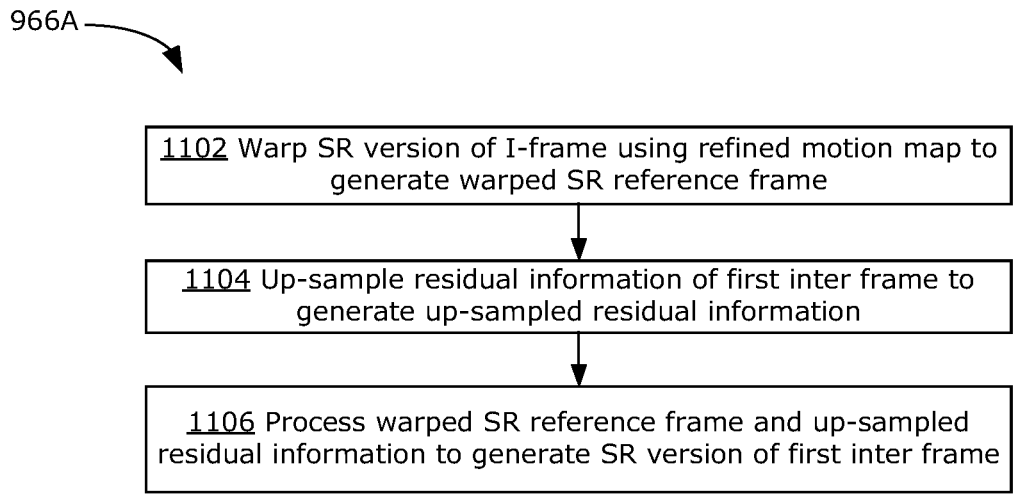
FIG. 11 is a flowchart showing alternative example operations of the step of generating an SR version of an inter frame of FIG. 9B using the alternative example non-key frame SR module of FIG. 10.

FIG. 10 is a schematic diagram of an alternative example non-key frame SR module 226A of the VSR software system 222 of FIG. 3. The same architecture is used for the VSR software system 222 as that shown in FIG. 3, with only the internal details of the non-key frame SR module 226, shown in FIG. 5, being changed to reflect FIG. 10.

The alternative example non-key frame SR module 226A differs from the first example embodiment 226 in that, out of the five submodules of the first example embodiment 226, only the MV refining sub-module 512 is retained, and the other four submodules 514, 516, 518, 520 are omitted. The warping submodule 1012 is exactly the same as the warping submodule 612 of FIG. 6A, differing only in the resolution of its operation (SR instead of LR), its inputs (the SR reference frame 504 instead of the LR reference frame 506, and the SR MV map 524 of the target frame instead of the LR MV map 216 of the target frame), and its output (a warped SR reference frame 1026 instead of the LR warped reference frame $\tilde{I}_r$). An up-sampling submodule 1016 uses a bicubic kernel to up-sample the LR residual map 218 of the target frame. The SR MV map 522 of the target frame is estimated by the MV refining submodule 512, as in the first embodiment 226, to describe the correspondence between the reference frame and the target frame. Unlike the first embodiment 226, however, this alternative embodiment 226A realizes the idea of re-using high-frequency (HF) details of the reference frame to help generate the SR version of the target frame by directly warping the SR reference frame 504 in the pixel domain. The target frame's residual map 218 is then up-sampled and added to the warped SR reference frame 1026 to generate the target SR frame 1032.

FIG. 11 is a flowchart showing an alternative embodiment 966A of step 966 of method 900 for generating an SR version of an inter frame, using the alternative example non-key frame SR module 226A of FIG. 10.

At 1102, the SR reference frame 504 (e.g., the SR version of the first I-frame) is warped by the warping submodule 1014 using the refined motion map (SR MV map 522 of the target frame, e.g., the first inter frame) to generate a warped SR reference frame 1026.

At 1104, the up-sampling submodule 1016 up-samples the residual information of the target frame (e.g., residual map 218 of the first inter frame) to generate up-sampled residual information.

At 1106, the warped SR reference frame 1026 and the up-sampled residual information are processed (e.g., by a pixel-wise addition operation) to generate the SR target frame 1032 (e.g., the SR version of the first inter frame).

Methods and Processor Readable Media

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method for generating a super-resolution version of a compressed video stream, the method comprising:
obtaining at least a portion of the compressed video stream comprising a plurality of frame encodings representative of a temporal sequence of frames, the plurality of frame encodings comprising:
an intra-coded frame (I-frame) encoding representative of an I-frame; and
a first inter frame encoding representative of a first inter frame subsequent to the I-frame in the temporal sequence, comprising:
motion information of the first inter frame relative to the I-frame; and
residual information of the first inter frame relative to the I-frame;
decoding the I-frame encoding to generate the I-frame;
decoding the first inter frame encoding to generate:
the first inter frame;
the motion information of the first inter frame; and
the residual information of the first inter frame;
processing the I-frame to generate a super-resolution version of the I-frame; and
generating a super-resolution version of the first inter frame by processing:
the first inter frame;
the motion information of the first inter frame;
the residual information of the first inter frame;
the I-frame; and
the super-resolution version of the I-frame,
wherein the plurality of frame encodings further comprises a second inter frame encoding representative of a second inter frame subsequent to the first inter frame in the temporal sequence, comprising:
motion information of the second inter frame relative to the first inter frame; and
residual information of the second inter frame relative to the first inter frame;
the method further comprising:
decoding the second inter frame encoding to generate:
the second inter frame;
the motion information of the second inter frame; and
the residual information of the second inter frame; and
generating a super-resolution version of the second inter frame by processing:
the second inter frame;
the motion information of the second inter frame;
the residual information of the second inter frame;
the first inter frame; and
the super-resolution version of the first inter frame, and
wherein processing the I-frame to generate a super-resolution version of the I-frame comprises:
generating a super-resolution version of the I-frame by processing:
the I-frame;
the first inter frame; and
an additional frame decoded from the compressed video stream, the additional frame being prior to the temporal sequence of frames.

2. The method of claim 1, wherein:
the plurality of frame encodings further comprises a further inter frame encoding representative of a further inter frame subsequent to the second inter frame in the temporal sequence;
further comprising:
decoding the further inter frame encoding to generate:
the further inter frame;
identifying the further inter frame as a key frame; and
generating a super-resolution version of the further inter frame by processing:
the further inter frame;
at least one frame, prior to the further inter frame in the temporal sequence, decoded from the compressed video stream; and
at least one frame, subsequent to the further inter frame in the temporal sequence, decoded from the compressed video stream.

3. The method of claim 1, wherein the super-resolution version of the first inter frame is generated by:
processing the I-frame, the first inter frame, the motion information of the first inter frame, and the residual information of the first inter frame to generate a refined motion map; and
processing the refined motion map, the super-resolution version of the I-frame, and the residual information of the first inter frame to generate the super-resolution version of the first inter frame.

4. The method of claim 3, wherein the refined motion map is generated by:
warping the I-frame using the motion information of the first inter frame to generate a warped I-frame;
concatenating the first inter frame, the motion information of the first inter frame, the residual information of the first inter frame, and the warped I-frame to generate a concatenated tensor;
processing the concatenated tensor using a first convolution layer of a MV refining convolutional neural network (CNN);
processing the output of the first convolution layer using a first residual dense block of the MV refining CNN;
processing the output of the first residual dense block using one or more inter convolution layers and one or more inter residual dense blocks of the MV refining CNN to generate a MV refining CNN output tensor;
reshaping the MV refining CNN output tensor using a pixel shuffling operation to generate a reshaped MV refining tensor;
up-sampling the motion information of the first inter frame to generate up-sampled motion information; and
processing the reshaped MV refining tensor and the up-sampled motion information to generate the refined motion map.

5. The method of claim 3, wherein processing the refined motion map, the super-resolution version of the I-frame, and the residual information of the first inter frame to generate the super-resolution version of the first inter frame comprises:
processing the refined motion map and the super-resolution version of the I-frame to generate a warped high-frequency feature map;
processing the first inter frame to generate a feature map of the first inter frame;
processing the feature map of the first inter frame, the warped high-frequency feature map, and the residual information of the first inter frame to generate a fused feature map; and
processing the fused feature map and the first inter frame to generate the super-resolution version of the first inter frame.

6. The method of claim 5, wherein the warped high-frequency feature map is generated by:
   processing the super-resolution version of the I-frame using one or more convolution layers to generate a HF feature tensor;
   warping the HF feature tensor using the refined motion map to generate a warped HF feature tensor; and
   reshaping the warped HF feature tensor using a pixel unshuffling operation to generate the warped high-frequency feature map.

7. The method of claim 3, wherein processing the refined motion map, the super-resolution version of the I-frame, and the residual information of the first inter frame to generate the super-resolution version of the first inter frame comprises:
   warping the super-resolution version of the I-frame using the refined motion map to generate a warped super-resolution reference frame;
   up-sampling the residual information of the first inter frame to generate up-sampled residual information; and
   processing the warped super-resolution reference frame and the up-sampled residual information to generate the super-resolution version of the first inter frame.

8. A device, comprising:
   a processor; and
   a memory storing instructions which, when executed by the processor, cause the device to generate a super-resolution version of a compressed video stream by:
      obtaining at least a portion of the compressed video stream comprising a plurality of frame encodings representative of a temporal sequence of frames, the plurality of frame encodings comprising:
         an intra-coded frame (I-frame) encoding representative of an I-frame; and
         a first inter frame encoding representative of a first inter frame subsequent to the I-frame in the temporal sequence, comprising:
            motion information of the first inter frame relative to the I-frame; and
            residual information of the first inter frame relative to the I-frame;
      decoding the I-frame encoding to generate the I-frame;
      decoding the first inter frame encoding to generate:
         the first inter frame;
         the motion information of the first inter frame; and
         the residual information of the first inter frame;
      processing the I-frame to generate a super-resolution version of the I-frame; and
      generating a super-resolution version of the first inter frame by processing:
         the first inter frame;
         the motion information of the first inter frame;
         the residual information of the first inter frame;
         the I-frame; and
         the super-resolution version of the I-frame,
   wherein the plurality of frame encodings further comprises a second inter frame encoding representative of a second inter frame subsequent to the first inter frame in the temporal sequence, comprising:
      motion information of the second inter frame relative to the first inter frame; and
      residual information of the second inter frame relative to the first inter frame; and
   the instructions, when executed by the processor, further cause the device to:
      decode the second inter frame encoding to extract:
         the second inter frame;
         the motion information of the second inter frame; and
         the residual information of the second inter frame; and
      generate a super-resolution version of the second inter frame by processing:
         the second inter frame;
         the motion information of the second inter frame;
         the residual information of the second inter frame;
         the first inter frame; and
         the super-resolution version of the first inter frame,
   wherein processing the I-frame to generate a super-resolution version of the I-frame comprises:
      generating a super-resolution version of the I-frame by processing:
         the I-frame;
         the first inter frame; and
         an additional frame decoded from the compressed video stream, the additional frame being prior to the temporal sequence of frames.

9. The device of claim 8, wherein the instructions, when executed by the processor, further cause the device to:
   process the portion of the compressed video stream to identify a key frame encoding of the plurality of frame encodings, the key frame encoding being representative of a further inter frame subsequent to the second inter frame in the temporal sequence;
   decode the key frame encoding to generate:
      the further inter frame; and
   generate a super-resolution version of the further inter frame by processing:
      the further inter frame;
      at least one frame, prior to the further inter frame in the temporal sequence, decoded from the compressed video stream; and
      at least one frame, subsequent to the further inter frame in the temporal sequence, decoded from the compressed video stream.

10. The device of claim 8, wherein the super-resolution version of the first inter frame is generated by:
    processing the I-frame, the first inter frame, the motion information of the first inter frame, and the residual information of the first inter frame to generate a refined motion map; and
    processing the refined motion map, the super-resolution version of the I-frame, and the residual information of the first inter frame to generate the super-resolution version of the first inter frame.

11. The device of claim 10, wherein the refined motion map is generated by:
    warping the I-frame using the motion information of the first inter frame to generate a warped I-frame;
    concatenating the first inter frame, the motion information of the first inter frame, the residual information of the first inter frame, and the warped I-frame to generate a concatenated tensor;
    processing the concatenated tensor using a first convolution layer of a MV refining convolutional neural network (CNN);
    processing the output of the first convolution layer using a first residual dense block of the MV refining CNN;
    processing the output of the first residual dense block using one or more inter convolution layers and one or more inter residual dense blocks of the MV refining CNN to generate a MV refining CNN output tensor;

reshaping the MV refining CNN output tensor using a pixel shuffling operation to generate a reshaped MV refining tensor;

up-sampling the motion information of the first inter frame to generate up-sampled motion information; and processing the reshaped MV refining tensor and the up-sampled motion information to generate the refined motion map.

12. The device of claim 10, wherein processing the refined motion map, the super-resolution version of the I-frame, and the residual information of the first inter frame to generate the super-resolution version of the first inter frame comprises:

processing the refined motion map and the super-resolution version of the I-frame to generate a warped high-frequency feature map;

processing the first inter frame to generate a feature map of the first inter frame;

processing the feature map of the first inter frame, the warped high-frequency feature map, and the residual information of the first inter frame to generate a fused feature map; and processing the fused feature map and the first inter frame to generate the super-resolution version of the first inter frame.

13. The device of claim 12, wherein the warped high-frequency feature map is generated by:

processing the super-resolution version of the I-frame using one or more convolution layers to generate a HF feature tensor;

warping the HF feature transfer convolution output tensor using the refined motion map to generate a warped HF feature tensor; and reshaping the warped HF feature tensor using a pixel unshuffling operation to generate the warped high-frequency feature map.

14. The device of claim 12, wherein processing the refined motion map, the super-resolution version of the I-frame, and the residual information of the first inter frame to generate the super-resolution version of the first inter frame comprises:

warping the super-resolution version of the I-frame using the refined motion map to generate a warped super-resolution reference image;

up-sampling the residual information of the first inter frame to generate up-sampled residual information; and processing the warped super-resolution reference image and the up-sampled residual information to generate the super-resolution version of the first inter frame.

15. A non-transitory processor-readable medium having tangibly stored thereon instructions that, when executed by a processor of a device, cause the device to perform the method of claim 1.

16. A method for generating a super-resolution version of a first inter frame of a compressed video stream, the method comprising:

obtaining:
an intra-coded frame (I-frame),
the first inter frame,
motion information of the first inter frame, and
residual information of the first inter frame;
decoded from at least a portion of the compressed video stream;

obtaining a super-resolution version of the I-frame;

processing the I-frame, the first inter frame, the motion information of the first inter frame, and the residual information of the first inter frame to generate a refined motion map; and processing the refined motion map, the super-resolution version of the I-frame, and the residual information of the first inter frame to generate the super-resolution version of the first inter frame.

* * * * *